United States Patent [19]
Okamura et al.

[11] Patent Number: 5,855,157
[45] Date of Patent: Jan. 5, 1999

[54] SAW BLADE

[75] Inventors: Hidezumi Okamura; Ryuji Ohtani; Isao Fuwa; Noboru Kusano; Masahiro Ikegami; Masao Torigoe; Shoichi Hongo, all of Kadoma, Japan

[73] Assignee: Matsushita Electric Works, Ltd., Osaka, Japan

[21] Appl. No.: 873,560

[22] Filed: Jun. 12, 1997

Related U.S. Application Data

[63] Continuation of Ser. No. 388,570, Feb. 14, 1995, abandoned.

[30] Foreign Application Priority Data

Feb. 23, 1994 [JP] Japan ..................... 6-318302

[51] Int. Cl.$^6$ ......................................................... B26D 1/46
[52] U.S. Cl. ............................... 83/830; 83/832; 83/835; 83/838; 83/855
[58] Field of Search .................... 83/830, 832–839, 83/845, 846, 853–855; 407/117, 113

[56] References Cited

U.S. PATENT DOCUMENTS

| | | |
|---|---|---|
| 561,094 | 6/1896 | Dahl et al. ........................... 83/845 |
| 2,648,360 | 8/1953 | Fall .................................. 83/853 |
| 3,344,822 | 10/1967 | Wilder ................................ 83/837 |
| 3,358,720 | 12/1967 | Anderson ............................. 143/133 |
| 3,362,446 | 1/1968 | Potomak ............................. 143/133 |
| 3,380,497 | 4/1968 | La Velle ............................. 83/839 |
| 3,945,289 | 3/1976 | Baez Rios ........................... 83/839 |
| 3,990,334 | 11/1976 | Mellegren ........................... 83/837 |
| 4,236,432 | 12/1980 | Kawakami et al. .................... 83/848 |
| 4,765,217 | 8/1988 | Ludwig .............................. 83/841 |
| 4,848,205 | 7/1989 | Suzuki et al. ....................... 83/839 X |
| 5,139,064 | 8/1992 | Nunweiler ........................... 83/853 X |
| 5,205,199 | 4/1993 | Maclennan .......................... 83/839 |
| 5,261,306 | 11/1993 | Morey et al. ........................ 83/840 |

FOREIGN PATENT DOCUMENTS

| | | |
|---|---|---|
| 60-94038 | 6/1985 | Japan . |
| 1151382 | 5/1969 | United Kingdom ............ B27B 33/02 |

Primary Examiner—M. Rachuba
Attorney, Agent, or Firm—Lynn & Lynn

[57] ABSTRACT

A saw blade preventing "fluff" or "return" of fibers from occurring when used to cut wood or the like object and rendering any finishing work unnecessary is formed with a unique combination of cutting teeth and biting teeth, the biting teeth being disposed, on a cut path mainly by means of the cutting teeth, either on top surface of or in front of each cutting tooth in cutting direction of the saw blade and to have a smaller width than the cutting teeth, for realizing a biting operation by the biting teeth and the cutting operation by the cutting teeth in the same sawing step.

2 Claims, 31 Drawing Sheets

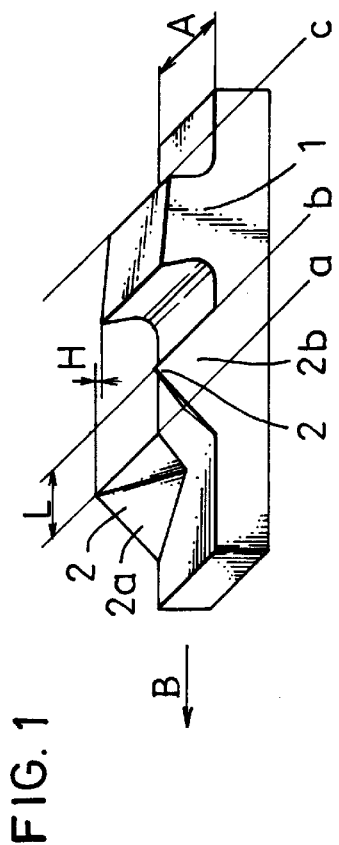
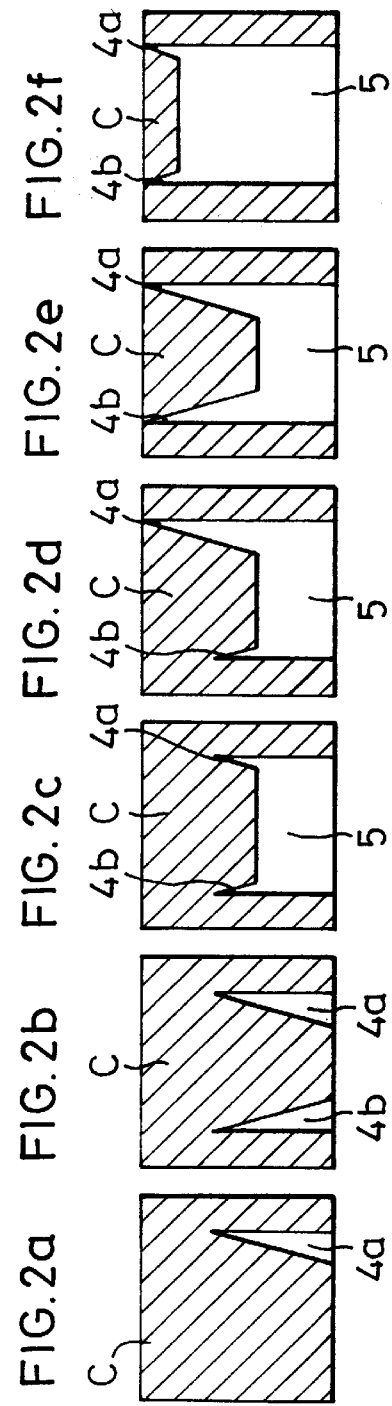
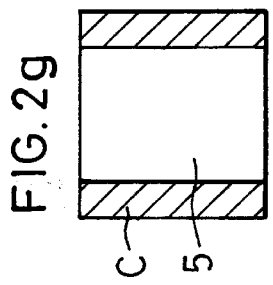
FIG. 1
FIG. 2a FIG. 2b FIG. 2c FIG. 2d FIG. 2e FIG. 2f FIG. 2g

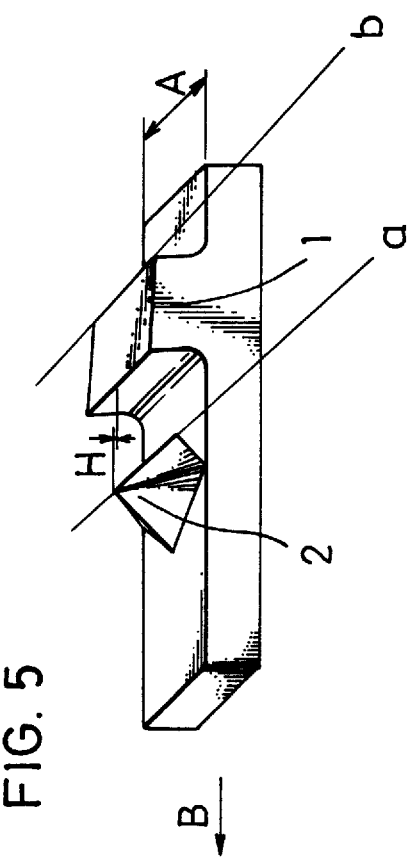
FIG. 5
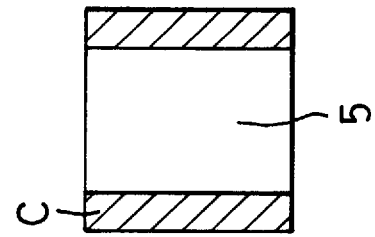
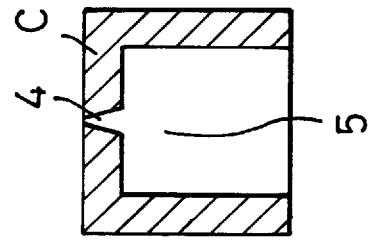
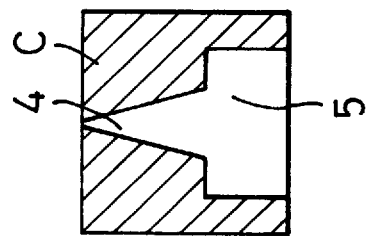
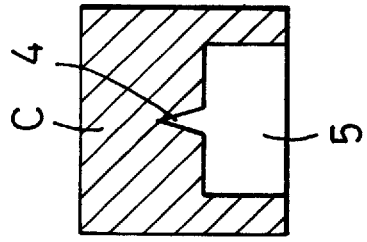
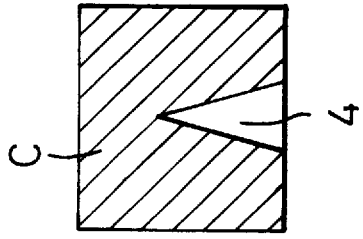

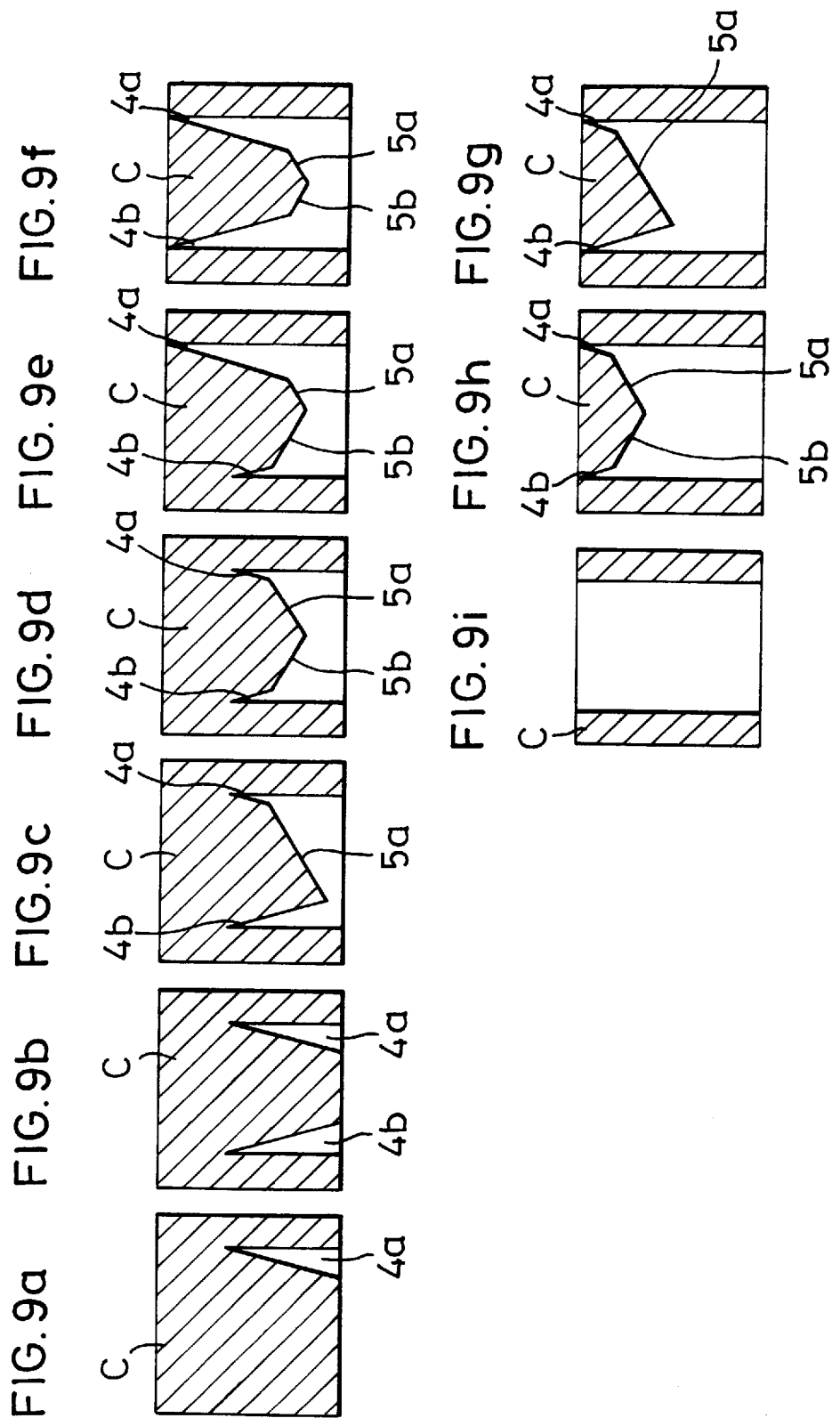

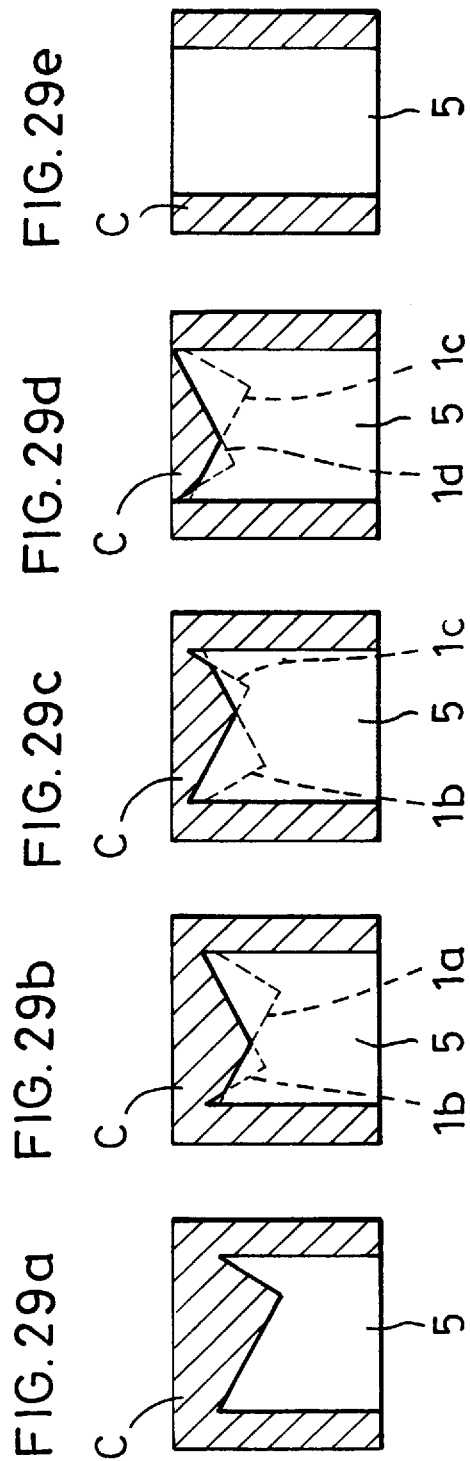

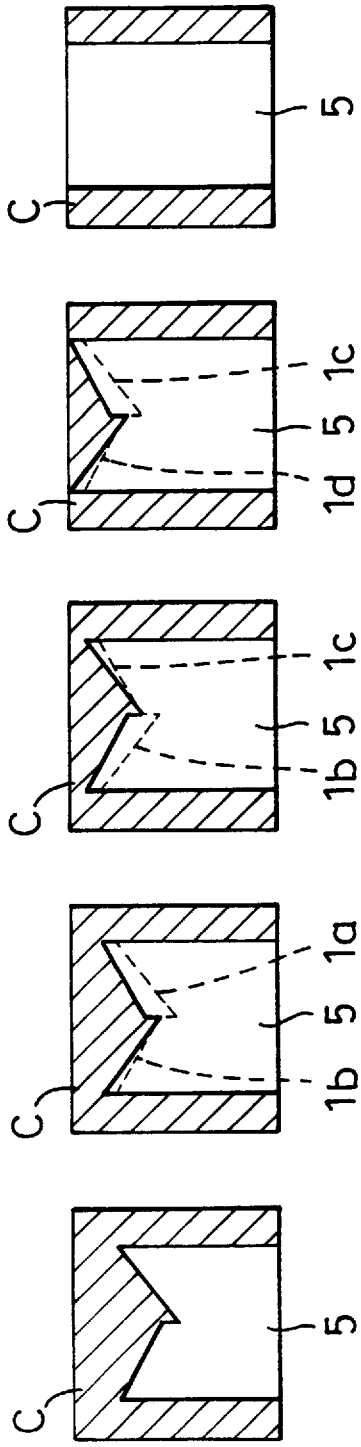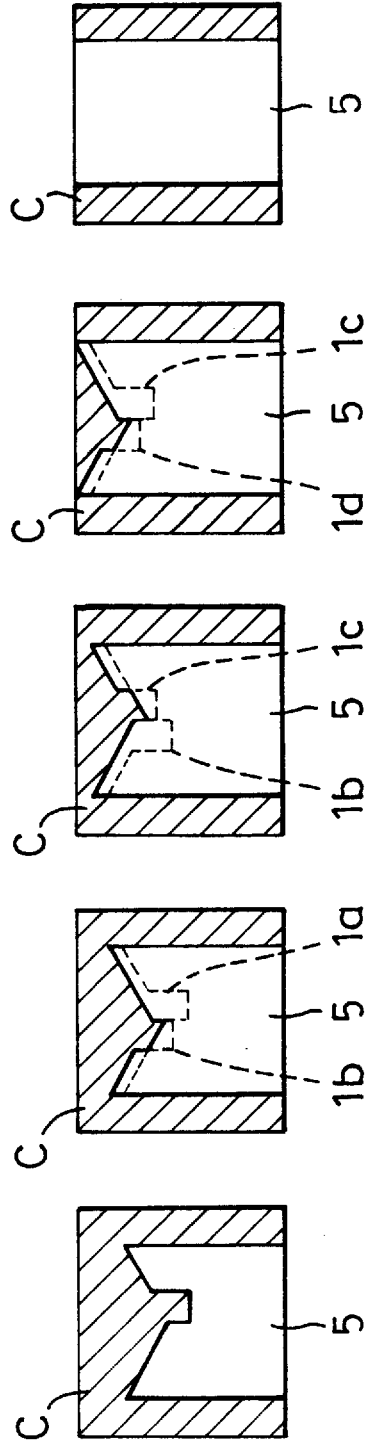

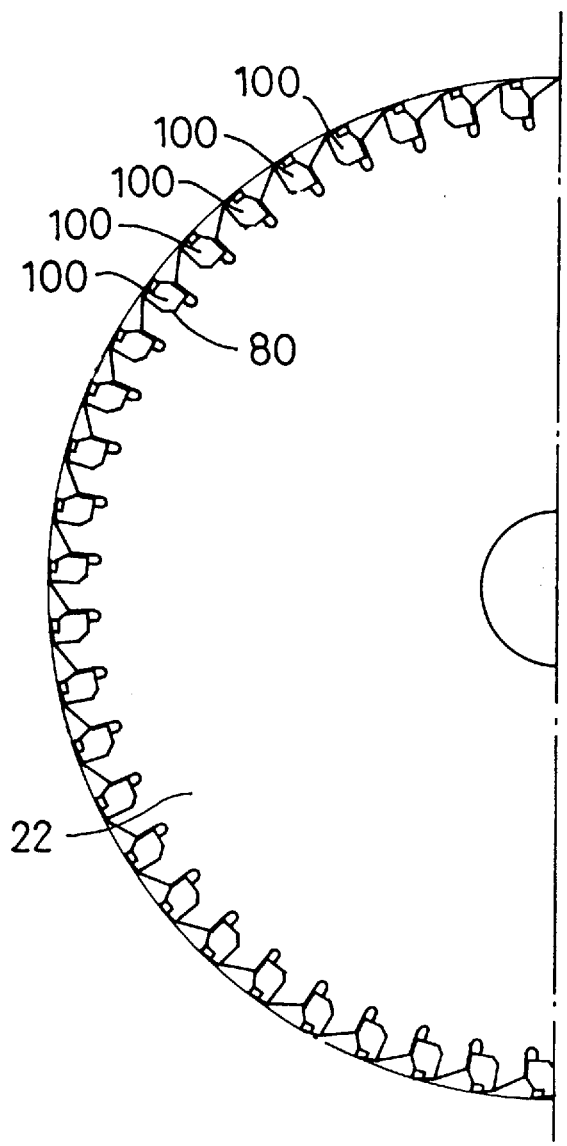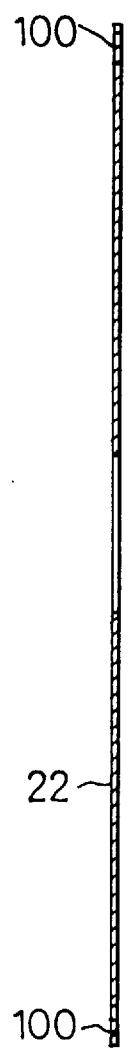
FIG. 48a
FIG. 48b

SAW BLADE

This is a continuation of application Ser. No. 08/388,570 filed on Feb. 14, 1995 now abandoned.

BACKGROUND OF THE INVENTION

This invention relates to a saw blade.

DESCRIPTION OF RELATED ART

A saw blade has been suggested in, for example, Japanese Utility Model Laid-Open Publication No. 60-94038, in which the saw blade has comprised of only cutting teeth formed in sequence and there has been a problem that "fluffs" or "returns" are caused to occur upon cutting of wood or the like so that cut surfaces of the wood could not be fine.

Referring here to the "fluff" or "return" with reference to FIG. 50, these terms refer to fibers of wood or glass-fiber containing resin et al. (which shall be referred to just as "wood" hereinafter) have been cut only on one side to be partly torn up, the wooden fibers which have not been cut sharply but rather plucked off, or the wooden fibers not cut at all and just fully torn up, and a discrimination between them has been made depending on the size, such that the fibers torn up to a larger extend are regarded as the "return" while the fibers torn up to a smaller extent as the "fluff". More specifically, the torn-up fibers of a size about to be a width of cutting by the saw blade are called "fluff" and those of a size more than that are called "return". In FIG. 50, a reference figure "30" denotes the "fluff" while a reference figure "31" denotes the "return", while a symbol "C" denotes the wood already cut here.

Referring to how the "fluff" or "return" occurs in cutting the woods or the like object to be cut with conventional saw blades, the respective fibers are to be first cut only at a certain portion, for example, on right hand side of the fiber with a tip edge of first coming saw teeth so that, when the thus partly cut fibers meet the tip edge of next coming saw teeth, the fibers already cut only on the right hand side remain in cantilevered state to be hard to be cut by the next coming saw teeth, and such cantilevered fibers are caused to stand up so as to render the "fluff" or "return" to occur, as a conventional problem. For this reason, it has been required to perform a finishing work in addition to the above cutting step.

SUMMARY OF THE INVENTION

The present invention has been suggested in view of the foregoing problem of conventional saw blade, and is to provide a saw blade which can prevent any "fluff" and "return" from occurring so as to render the finishing work unnecessary, prevent any clogging of the cutting path from occurring with chips discharged from the path in smooth manner and with a chip-receiving capacity increased, render any finishing work of side surfaces of the cut path unnecessary, and allow required cutting power to be minimized.

In order to establish the object of the present invention by eliminating the foregoing problem, there is provided a saw blade characterized in comprising cutting teeth, and biting teeth, the biting teeth being projected to a cut path of the cutting teeth at least at one of a top surface position of the respective cutting teeth and a front side position in cutting direction of the cutting teeth and being made to have a smaller width than the cutting teeth.

According to the saw blade of the above arrangement comprising the cutting teeth and the biting teeth, the latter being projected to a cut path of the cutting teeth at least at one of a top surface position of the respective cutting teeth and a front side position in cutting direction of the cutting teeth and being made to have a smaller width than the cutting teeth, it is enabled to cut fibers of woods as a cutting object by the biting teeth, and to cut the wooden fibers left in the cut path by the cutting teeth, whereby the teeth for initially cutting the fibers of the wood are separated from those for further cutting the fibers so as to form the cut path, and the occurrence of "fluff" and "return" can be prevented.

Other objects and advantages of the present invention shall become clear as the description of the invention advances in the followings with reference to accompanying drawings.

BRIEF DESCRIPTION OF THE DRAWINGS

FIG. 1 is a fragmentary perspective view of blade edge part of the saw blade in an embodiment according to the present invention;

FIGS. 2a through 2g are explanatory sectioned views of the cutting object for cutting sequence attained by means of the saw blade of FIG. 1;

FIG. 5 is a fragmentary perspective view at blade edge part of the saw blade in another embodiment according to the present invention;

FIGS. 6a through 6e are explanatory sectioned views of the cutting object for the cutting sequence attained by means of the saw blade of FIG. 5;

FIGS. 9a through 9i are explanatory sectioned views of the cutting object for the cutting sequence attained by means of the blade of FIG. 8;

FIGS. 29a through 29e are explanatory sectioned views for cutting sequence attained by means of the blade edge part of FIG. 28;

FIGS. 31a through 31e are explanatory sectioned views for cutting sequence attained by the blade edge part of FIG. 30;

FIGS. 33a through 33e are explanatory sectioned views for cutting sequence attained by means of the blade edge part of FIG. 32;

FIGS. 35a through 35c are respectively a fragmentary plan view of a blade edge part in another embodiment, its Y—Y line sectioned view of the blade edge part of FIG. 35a, and a fragmentary plan view a blade edge part in a related embodiment to the embodiment of FIG. 35a;

FIGS. 48a and 48b are respectively a side view showing entire arrangement of the blade edge part and a sectioned view of the blade employing the blade edge part shown in FIG. 46 and 48;

DETAILED DESCRIPTION OF THE PREFERRED EMBODIMENTS

The present invention shall now be described in details with reference to the respective embodiments shown in the accompanying drawings. Now, the saw blade according to the present invention consists of a high speed steel plate or a super hard alloy plate coated by means of a TiN coating, diamond coating or shot peening, for example. For its manufacturing method, it is possible to employ such molding as a metal injection molding (MIM), grinding mold, combined MIM and grinding molding and the like.

The saw blade according to the present invention comprises, in the embodiment of FIG. 1, cutting teeth 1 though only one is shown, and biting teeth 2 though only two are shown, the biting teeth 2 being disposed within a cut path A of the cutting teeth 1 to project at least at one of top surface of the cutting teeth 1 and of a front position of the cutting teeth in their cutting direction B and having a smaller blade width than the cutting teeth 1. That is, the saw blade is provided with the cutting teeth 1 for cutting or forming the cut path A in a cutting object, and the biting teeth 2 for cutting fibers of the object seperately from the cutting teeth 1. Here, the biting teeth 2 are made larger in the height than the cutting teeth 1, and the biting teeth 2 may be provided either to be on the top surface of the cutting teeth 1 or to be projected in the cutting direction B. With the thus provided cutting blade 1 and biting teeth 2, wooden fibers are cut by the biting teeth 2 and woods C are cut at the cut path A by the cutting teeth 1.

Here, in the embodiment disposing the biting teeth 2 in front position in the cutting direction B of the cutting teeth 1, there are two aspects, in one of which the biting teeth 2 are disposed on both side edges of the cut path A and in the other of which the biting tooth or teeth 2 may be disposed at other position than the both side edges.

With the provision of the biting teeth 2 on both side edges of the cut path A, the fibers of the wood C on both sides of the cut path A are enabled to be cut by the biting teeth 2 provided on both side edges and the "fluff" or "return" can be prevented from occurring. When the molding is made by the MIM, the blade can be formed even with a smaller pitch, the "fluff" or "return" can be prevented from occurring as much as possible, and it is made possible to further prevent the "fluff" or "return" from occurring by minimizing the pitch with the blade having such biting teeth as in the present invention as formed through the MIM.

Figure 3:
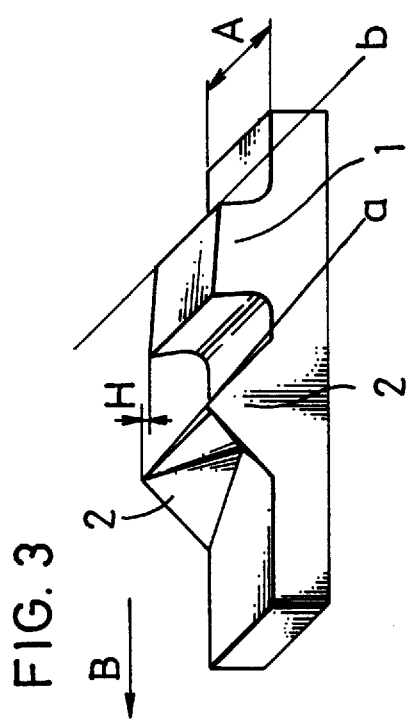
FIG. 3 is a fragmentary perspective view of blade edge part of the saw blade in another embodiment according to the present invention.

In FIGS. 1 and 3, there are shown embodiments in the former of which the biting teeth 2 are disposed at positions in front of the cutting tooth 1 as mutually separated in its cutting direction B, and in the latter of which the biting teeth 2 are at the same position in front of the cutting tooth 1 in the direction B, respectively on both side edges of the cut path A.

Thus, in the embodiment of FIG. 1, the biting teeth 2 disposed on both side edges of the cut path A are deviated in the cutting direction B in disposing these biting teeth 2 at the position in front of the cutting tooth 1 in the cutting direction B. In this embodiment of FIG. 1, the distance of deviation of the biting teeth 2 in the cutting direction B is 1.0 to 5.0 mm. Further, in the embodiment of FIG. 1, the height of the biting teeth 2 is made larger than the cutting tooth 1 by 0.05 to 0.50 mm. That is, the biting teeth 2 and cutting tooth 1 have a height difference H of 0.05 to 0.50 mm in FIG. 1. The cutting of such object to be cut as wood C with the saw blade of the above formation is performed in such sequence as shown in FIGS. 2a through 2g. That is, as in FIG. 2a, first, a notch 4a is made by the biting tooth 2a positioned forward in the objective wood C, then, as in FIG. 2b, a further notch 4b is made by the further biting tooth 2b positioned behind in the cutting direction B on the other side of the cut path A, and, as in FIG. 2c, a cut 5 is partly formed with intermediate wood portion between the both notches 4a and 4b cut out by the cutting tooth 1. Here, the cutting advances as shown in FIGS. 2a, 2b and 2c respectively, as a shift of the saw blade advances to positions a, b and c of FIG. 1, and the positions a, b and c of FIG. 1 correspond repectively to each of FIGS. 2a, 2b and 2c. Further, as in FIG. 2d, the notch 4a is made again by the biting tooth 2a, then, as in FIG. 2e, the other notch 4b is made again by the biting tooth 2b, and, as in FIG. 2f, the intermediate portion between these notches 4a and 4b is cut off by the next coming cutting tooth 1 to further form the cut 5. FIG. 2g represents a state where the cut is completed, without occurrence of any "fluff" or "return". When the biting teeth 2a and 2b disposed on the both side edge parts of the cut path A are disposed as mutually deviated in the cutting direction B, it is possible not only to cut the fibers of the wood C on both sides of the cut path A by the biting teeth 2 provided on both side edges of the cut path A but also to cut the fibers by the biting teeth 2 at different timing, and a force applied to the blade upon cutting of the fibers of wood C on both sides of the cut path A with the biting teeth 2 provided on the both edge parts can be eventually minimized.

Figures 4A, 4B, 4C, 4D, 4E:
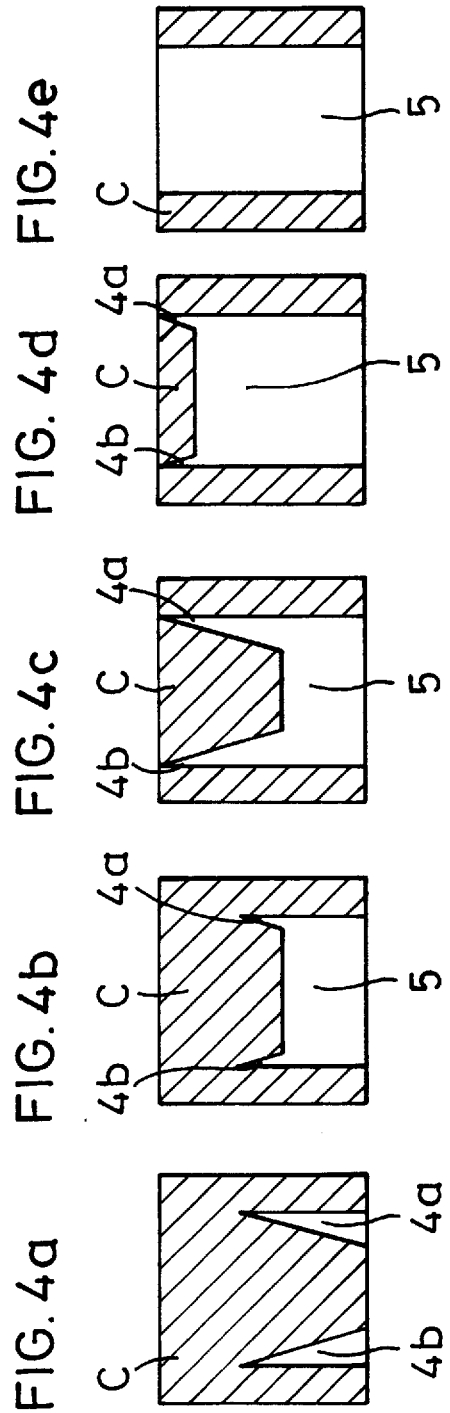
FIGS. 4a through 4e are explanatory sectioned views of the cutting object for the cutting sequence attained by means of the saw blade of FIG. 3.

In another embodiment shown in FIG. 3, there is shown an example in which, in disposing the biting teeth 2 on both side edges of the cut path A at forward position of the cutting tooth 1 in the cutting direction B, the both biting teeth 2 on the both side edges of the cut path A are disposed to oppose each other in a direction intersecting at right angles the cutting direction B. That is, both biting teeth 2 in this embodiment are not deviated in the cutting direction B. Further, the height difference H between the biting teeth 2 and the cutting teeth 1 in FIG. 3 is 0.05 to 0.50 mm (with the biting teeth 2 made higher than the cutting teeth 1). With the saw blade of the above formation employed, the cutting of such object to be cut as the wood C is performed in such sequence as shown in FIGS. 4a through 4e. That is, first, as in FIG. 4a, both side notches 4a and 4b are formed by the biting teeth 2a and 2b positioned forward in the cutting direction on both sides of the cut path A with respect to the objective wood C, and then, as in FIG. 4b, the intermediate wood portion between both notches 4a and 4b is cut off by the cutting tooth 1, to form partly the cut 5. Here, the cutting advances as in FIGS. 4a and 4b in accordance with the shift of the saw blade to the positions a and b of FIG. 3, and these positions a and b of FIG. 3 corresponds respectively to FIGS. 4a and 4b. Further, as in FIG. 4c, the notches 4a and 4b are further made by both biting teeth 2a and 2b, and then, as in FIG. 4d, the cut 5 is further formed by cutting off the intermediate wood part between both notches 4a and 4b by the cutting tooth 1. FIG. 4e shows a state in which the cutting is completed, the cutting having been made without occurrence of any "fluff" or "return". When the biting teeth 2 on both side edge parts of the cut path A are provided to oppose each other in the direction intersecting at right angles the cutting direction B, it is made possible not only to cut the fibers of the wood C on both sides of the cut path A by means of the biting teeth 2 provided on both side edges of the cut path A, but also to shorten the distance between the respective cutting teeth 1 so as to increase the number of the cutting teeth 1, so that a cutting resistance can be reduced.

In FIGS. 5 and 6, there is shown another embodiment, in which the biting teeth 2 are at other position than both side edges of the cut path A, in disposing the biting teeth 2 in the forward position in the cutting direction B of the cutting teeth 1. In the embodiment of FIG. 5, each biting tooth 2 is provided substantially in the center of the cut path A in the direction intersecting at right angles the cutting direction B, and the height difference H between the biting tooth 2 and the cutting tooth 1 is 0.50 to 0.50 mm (the biting tooth 2 being higher than the cutting tooth 1). The cutting of the objective wood C with the saw blade of such formation as in the above is performed in the sequence shown in FIGS. 6a through 6e. That is, as in FIG. 6a, first, a notch 4 is made by the biting tooth 2 substantially in the center of the cut path A of the objective wood C and, next, as in FIG. 6b the cut 5 is partly formed by cutting off the wood C over the width of the cut path A by the cutting tooth 1. Here, the cutting advances as in FIGS. 6a and 6b as the saw blade shifts through the respective positions a and b of FIG. 5, which positions corresponding to FIGS. 6a and 6b respectively. Further, as in FIG. 6c, the notch 4 is further made by the next coming biting tooth 2 substantially in the center of the cut path A, then, as in FIG. 6d, the cut 5 is further made by cutting off the wood over the width of the cut path A by the next coming cutting tooth 1, and the cut complete state of FIG. 6e is reached, showing the cut state without occurrence of any "fluff" or "return".

Figure 7:
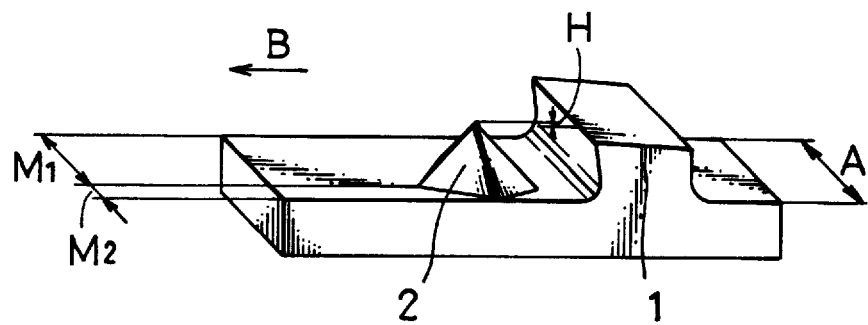
FIG. 7 is a fragmentary perspective view of blade edge part of the saw blade in another embodiment according to the present invention.
Figure 8A:
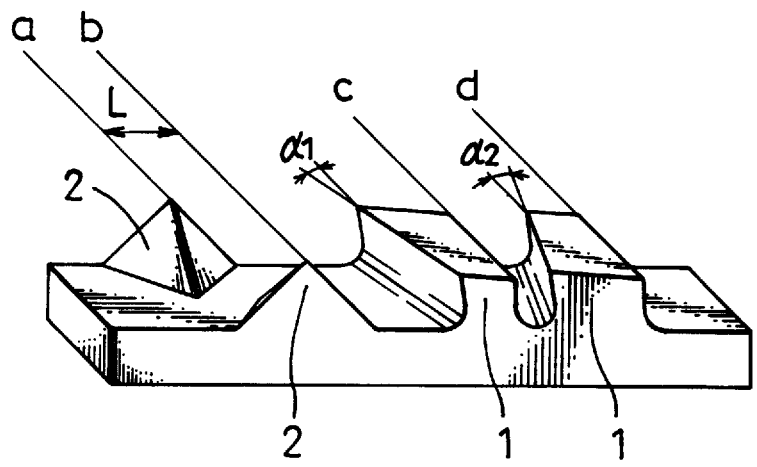
FIGS. 8a through 8d are respectively fragmentary perspective, top plan, one side and sectioned views at the blade edge part of the saw blade in still another embodiment according to the present invention, in which FIGS. 8b to 8d showing the blade of FIG. 8a with a biting teeth part omitted.
Figure 8B:
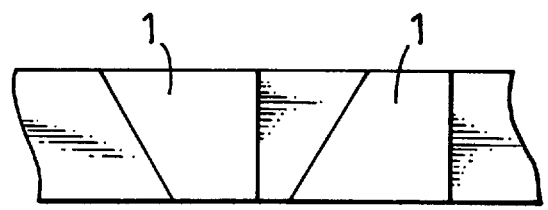
Figure 8C:
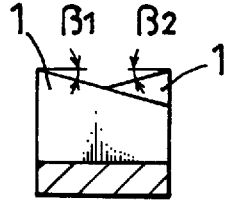
Figure 8D:
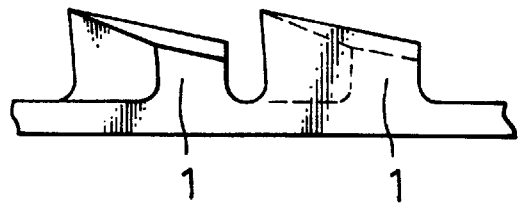

In FIG. 7, there is shown another embodiment in which the biting tooth 2 is off-centered from the substantial center position to one side edge of the cut path A in the direction intersecting at right angles the cutting direction. That is, in FIG. 7, $M_1>M_2$. Further, in the present embodiment, too, the cutting and biting teeth 1 and 2 have the height difference of 0.05 to 0.50 mm (the biting tooth 2 being higher than the cutting tooth 1). The cutting of the objective wood C with the saw blade of the above formation is carried out basically in the same sequence as that in the embodiment shown in FIG. 6 except for that the position of the notch 4 by means of the biting tooth 2 is deviated in the width direction of the cut path A.

As referred to in the above, the notches are made by the biting tooth 2 in the cut path A with the biting tooth 2 which is provided at other position than the side edges of the cut path A while the interior of the cut path A is cut off by the cutting tooth 1, so that any "fluff" even occurred can be made shorter at most than the width of the cut path A.

Now, in forming the saw blade according to the present invention with the cutting teeth 1 and the biting teeth 2 disposed on the cut path A of the cutting teeth 1 to project at least at one of the top surface position of the cutting teeth 1 and the forward position of the cutting teeth 1 in the cutting direction B and made smaller in the width than the cutting teeth 1, the cutting teeth 1 may be so formed that respective adjacent ones have lateral tripping angles mutually different.

Figure 10:
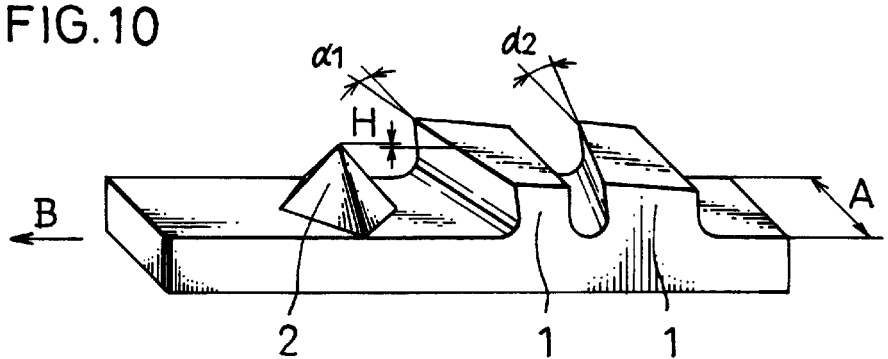
FIGS. 10 to 14 are respectively a fragmentary perspective view showing the blade edge part in each of further embodiments according to the present invention.

In FIGS. 8 and 10, there are shown examples of the cutting teeth 1 adjacent ones of which have the lateral tripping angles mutually different. In the embodiment of FIG. 8, the biting teeth 2 are disposed at both side edges of the cut path A at the forward position in the cutting direction B of the cutting teeth 1 and, in the embodiment of FIG. 10, the biting teeth 2 are provided at other positions than both side edges of the cut path A. Referring here to the embodiment of FIG. 8, the biting teeth 2 disposed at both side edges of the cut path A are deviated in the cutting direction B (by 1.0 to 5.0 mm in this embodiment), and the adjacent two cutting teeth 1a and 1b are made different in the lateral stripping angle. Here, the cutting and biting teeth 1 and 2 have a height difference of 0.05 to 0.50 mm (the biting teeth 2 being higher than the cutting teeth 1). The lateral stripping angles $\alpha_1$ and $\alpha_2$ of the cutting teeth 1a and 1b are respectively set to be 30° to 60°, and, as shown in FIG. 8, the adjacent cutting teeth 1a and 1b are provided with lateral relief angles $\beta_1$ and $\beta_2$ respectively, while these lateral relief angles $\beta_1$ and $\beta_2$ are set to be 5° to 15°. The cutting of the objective wood C with the saw blade of the above formation is performed in such sequence as shown in FIGS. 9a through 9i. That is, as in FIG. 9a, first, the notch 4a is made by the biting tooth 2a disposed forward in the cutting direction B on one side edge of the cut path A in the objective wood C, next, as in FIG. 9b, the other notch 4b is made by the biting tooth 2b positioned behind in the cutting direction on the other side of the cut path A, then, as in FIG. 9c, a partial cut 5a is formed by cutting off the wood between both notches 4a and 4b by forward side cutting tooth 1a and, thereafter, as in FIG. 9d, a further partial cut 5b is formed by rear side cutting tooth 1b. Here, the cutting advances as in FIGS. 9a through 9d respectively as the saw blade shifts through positions a to d of FIG. 8a, which positions a–d correspond to FIGS. 9a–9d respectively. Further, as in FIG. 9e, further notch 4a is made by the forward biting tooth 2a, next, as in FIG. 9f, the other notch 4b is further made by the rear biting tooth 1b, then, as in FIG. 9g, further partial cut 5a is formed by next coming forward cutting tooth 1a with the wood between both notches 4a and 4b cut off, and then, as in FIG. 9h, the other partial cut 5b is further formed by next coming rear cutting tooth 1b. FIG. 9i represents the state where the cutting is completed, showing that the cutting is made without any occurrence of "fluff" or "return". Here, in this embodiment, the biting teeth 2a and 2b on the both side edges of the cut path A may be provided without deviation in the cutting direction B but as opposed to each other in the direction intersecting at right angles the cutting direction B. Further, in disposing the biting teeth 2 at forward position of the cutting teeth 1 in the cutting direction B, the biting teeth 2 may be disposed at other positions than both side edges of the cut path A. However, since in the present embodiment the cutting teeth 1 are provided with the lateral stripping angle so that both side tooth edges will constitute the biting teeth 2, it is possible to advance the cutting of the cut path A while biting the wood with both side tooth edges of the cutting teeth 1 used as the biting teeth 2, and the occurrence of "fluff" and "return" can be made further difficult.

Figure 11:
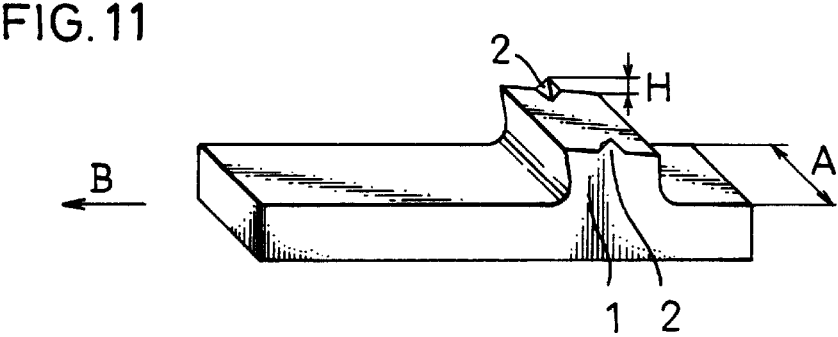
Figure 12:
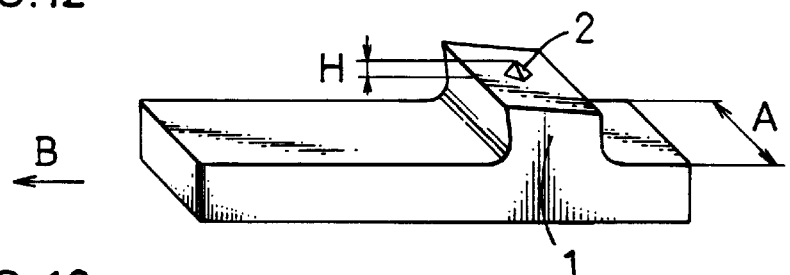
Figure 13:
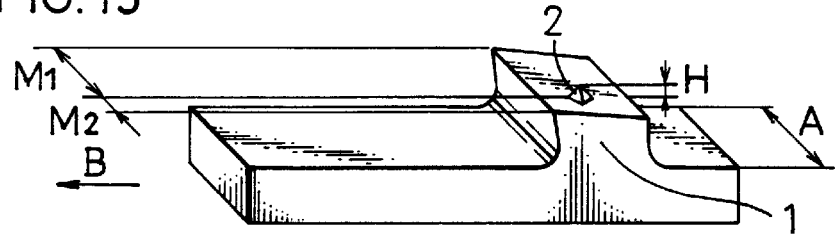

In FIGS. 11 through 13, there are shown further embodiments of the present invention, in which the biting teeth 2 are provided on the top surface of the cutting teeth 1.

In FIG. 11, the biting teeth 2 are provided at both side edges of the cut path A at the top surface of each cutting tooth 1, in which embodiment the cutting and biting teeth 1 and 2 have a height difference in a range of 0.05 to 0.50 mm (the biting teeth 2 being higher than the cutting teeth 1). Since the sequence of the cutting is the same as that already referred to with reference to FIG. 4, the description shall be omitted here. In the present embodiment, the biting teeth 2 are to cut the wooden fibers present in the cut path A at its both side edges and the cutting teeth 1 are to cut off the wooden fibers thus cut but remained in the cut path A so as to form the path A, whereas the thus provided biting teeth 2 are effective to shorten the distance between the respective cutting teeth 1 in contrast to the case where the biting teeth 2 are disposed between the respective cutting teeth 1, so that the number of the cutting teeth a can be increased to have the cutting resistance reduced. That is, the lesser number of the cutting teeth 1 renders the cutting amount of each cutting tooth to be larger so long as the cutting is carried out at the same speed and thus the cutting resistance to be increased, whereas the larger number of the cutting teeth 1 renders the cutting amount of each cutting tooth to be decreased and the cutting resistance is reduced.

Now, in FIGS. 12 and 13, there are shown other embodiments in which the biting teeth 2 are provided at other positions than the side edges of the cut path A on the top surface of the cutting teeth 1. FIG. 12 is an example of providing the biting tooth 2 substantially in the center in the direction intersecting at right angles the cut path A of the top surface of the cutting tooth 1, and FIG. 13 is an example of deviating the biting tooth 2 towards a side edge in the direction intersecting at right angles the cut path A, so that $M_1>M_2$. In these FIGS. 12 and 13, the cutting and biting teeth 1 and 2 are made to have the height difference H in the range of 0.05 to 0.50 mm (the biting teeth 2 are higher than the cutting teeth 1). Since the cutting sequence is the same basically as that of FIG. 6 already referred to, the description is omitted. In the present instance, the notch is made in the cut path A by the biting teeth 2, and the interior of the cut path A is to be cut off by the cutting teeth 1. Consequently, any "fluff" even occurring will be of a length shorter at most than the width of the cut path A. Further, in these embodiments, even the provision of the biting teeth 2, the distance between the respective cutting teeth 1 can be made shorter than in the case where the biting teeth 2 are provided between the cutting teeth 1, so that the number of the cutting teeth 1 can be increased and the cutting resistance can be reduced.

Figure 14:
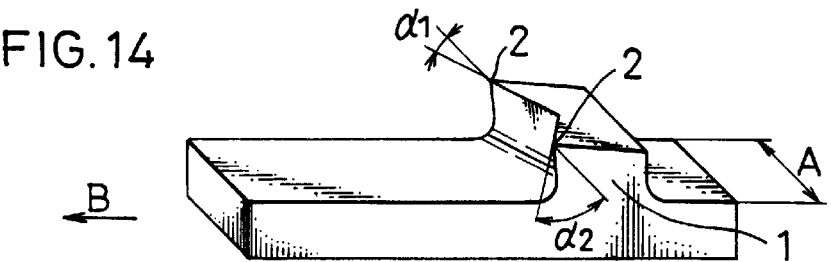

In FIGS. 14 and 15, there is shown still another embodiment of the present invention, in which the lateral tripping angles are provided to the cutting teeth 1 so that their both side cutting edges constitute the biting teeth 2.

Figure 15A:
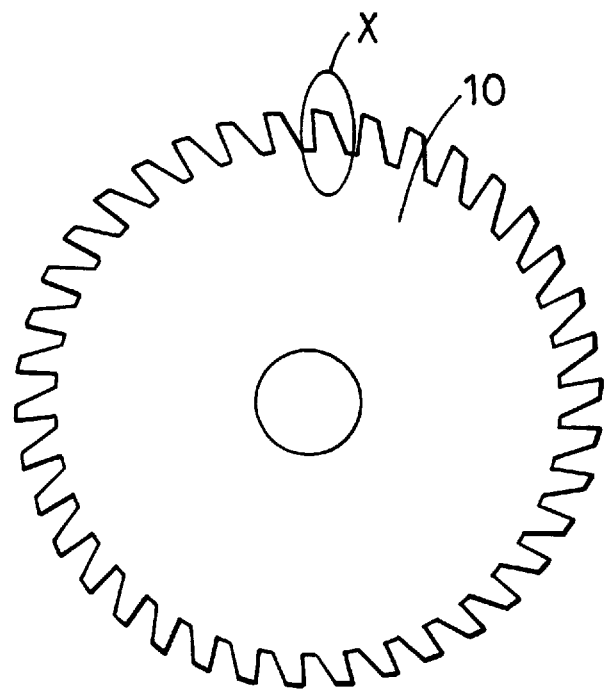
FIGS. 15a and 15b show respectively in a side elevation the saw blades to be provided with the blade edge part in the respective embodiments according to the present invention.
Figure 15B:
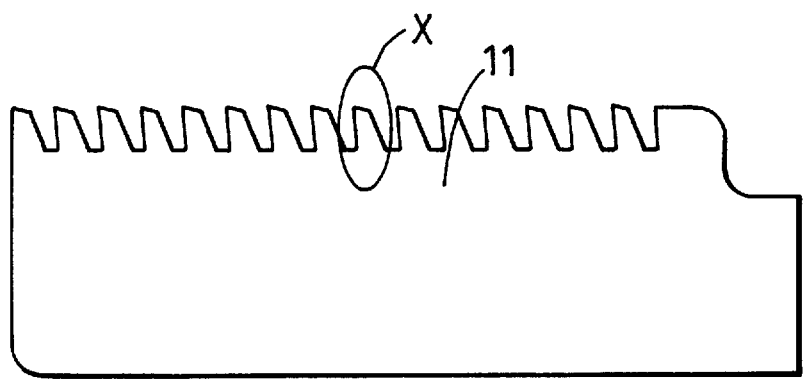

In FIG. 14, the lateral tripping angles $\alpha_1$ and $\alpha_2$ are so provided that both side cutting edges of the cutting teeth 1 on forward end side in the cutting direction of the cutting teeth 1 will act as the biting teeth 2, and the forward ends in the cutting direction at both side edges of the cutting teeth 1 are projected in the cutting direction. With such formation, the cutting of the cut path A by means of the cutting teeth 1 is so attained that the cutting off of the interior wood part in the cut path A can be made while forming the notches at both side edges of the cut path A by cutting both sides of the fibers in the path A with both side edges of the cutting teeth 1 acting as the biting teeth 2, and the cutting can be made without causing any "fluff" or "return". Further, with the provision of the biting teeth 2 to the cutting teeth 1 themselves, the distance between the respective cutting teeth 1 can be shortened than in the case where the biting teeth 2 are provided between the respective cutting teeth 1, notwithstanding the provision of the biting teeth, the number of the cutting teeth 1 can be increased, and the cutting resistance can be thereby reduced. The entirety of the saw blade in the present embodiment is shown in FIGS. 15a and 15b, FIG. 15a showing a circular saw blade 10 and FIG. 15b showing a linear saw blade 11, in both of which an encircled portion X having the formation of FIG. 14.

Figure 16:
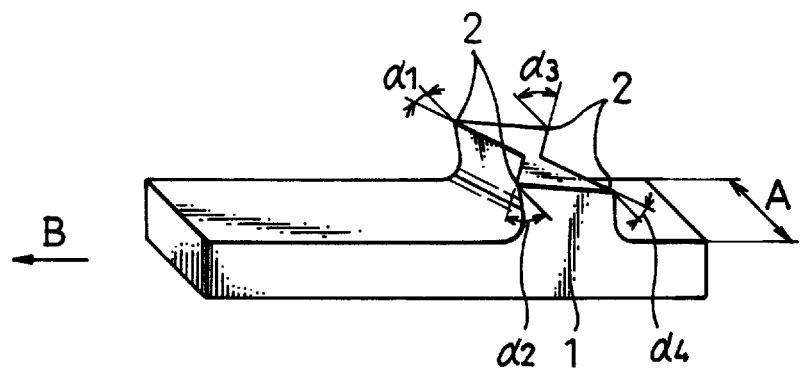
FIG. 16 is a fragmentary perspective view of blade edge part of the saw blade in still another embodiment according to the present invention.

In FIG. 16, the lateral stripping angles $\alpha_1$ and $\alpha_2$ are provided to the cutting teeth 1 to constitute the biting teeth 2 at both side edges on the forward end side in the cutting direction B of the cutting teeth 1 so as to have these forward ends in the cutting direction B at both side edges projected in the cutting direction, while further lateral stripping angles $\alpha_3$ and $\alpha_4$ are also provided to the cutting teeth 1 to constitute the biting teeth 2 at both side edges on the rear end side of the cutting teeth 1 so as to have these rear ends opposite to the cutting direction B at both side edges projected in the direction opposite to the cutting direction B. With this formation, the provision of the biting teeth 2 to both side edges on front and back sides of the cutting teeth 1 allows the fibers at both side edges of the cut path A to be cut by the side edges acting as the biting teeth 2 when the cut path A is cut off by the cutting teeth 1 in either events when the saw blade moves in the cutting direction B and in the reverse direction, so as to be able to cut off the cut path A with the cutting teeth 1 while forming the notches on both side edges of the path, without causing any "fluff" or "return", and the capability of being moved in both directions renders the life of the saw blade to be made longer than any conventional one. Yet, with the provision of the biting teeth 2 to the cutting teeth 1 themselves, the present embodiment also allows the distance between the respective cutting teeth 1 to be made longer than in the case where the biting teeth 2 are disposed between the cutting teeth 1, notwithstanding the provision of the biting teeth 2, the number of the cutting teeth 1 can be increased, and the cutting resistance can be reduced.

Figure 17A:
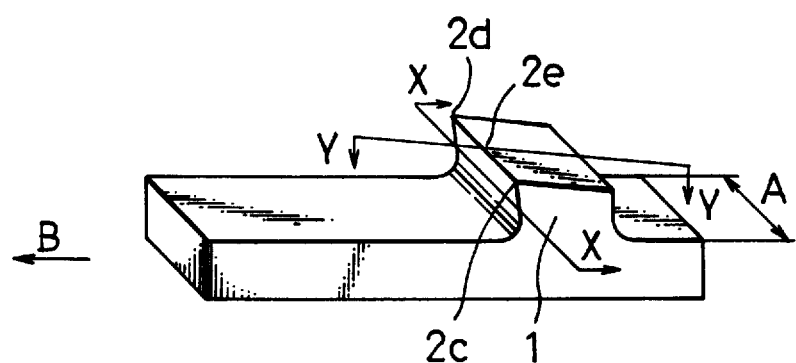
FIGS. 17a through 17c show respectively in a fragmentary perspective view, its X—X line sectioned view and its Y—Y line sectioned view a blade edge part of the saw blade in another embodiment according to the present invention.
Figures 17B, 17C:
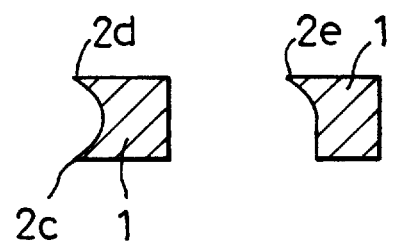

In FIGS. 17a through 17c, there is shown an embodiment in which the biting teeth 2c to 2e are formed at both side edges and middle portion of the cutting teeth 1, in which the biting teeth 2c and 2d formed at both side edges of the cutting teeth 1 are to cut the fibers on both side edges in the cut path A while the biting teeth 2e at the middle portion are to cut the fibers at bottom part in the cut path A, when the cut path A is cut off by the cutting teeth 1. With this saw blade having these biting teeth 2c, 2d and 2e provided at both side edges and middle portion, it is possible not only to prevent the "fluff" or "return" from occurring at both side edges of the cut path A but also to prevent the "fluff" or "return" from occurring at inner surfaces of the cut path A.

Figure 18A:
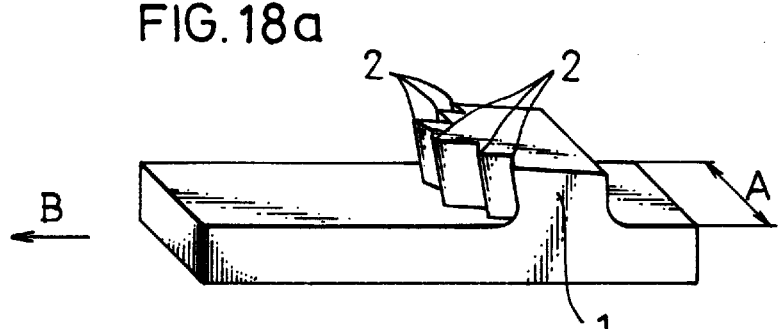
FIGS. 18a through 18c show respectively in a fragmentary perspective view, top plan view and side elevation a blade edge part in another embodiment according to the present invention.
Figure 18B:
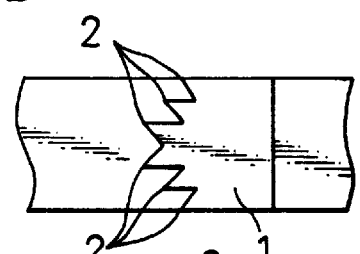
Figure 18C:
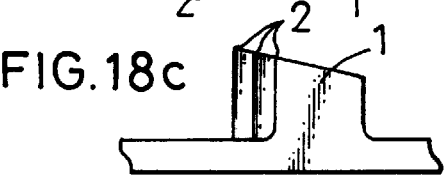

In FIGS. 18a to 18c, there is shown another embodiment of the present invention, in which the cutting teeth 1 an provided respectively at forward edge with the biting teeth 2 of mutually different projecting amount in the cutting direction B and, in this embodiment of FIG. 18, the projecting amount is set to be larger as the biting teeth 2 approach the center in the direction intersecting at right angles the cutting direction B. Thus, in this embodiment, the fibers of the wood C are bitten to be cut bit by bit with the biting teeth 2 of the different projection amount, so as to cut off the wood with the cutting teeth 1 to form the cut path A while preventing any "fluff" or "return" from occurring. In this case, further, the provision of the biting teeth 2 of the different projection amount in the cutting direction B at the forward edge in the cutting direction B of the respective cutting teeth 1 enables it possible to cut the fibers bit by bit with the biting teeth 2 of the different projection amount, so that the force applied to the teeth can be minimized and the life of blade edges can be prolonged.

Figure 19A:
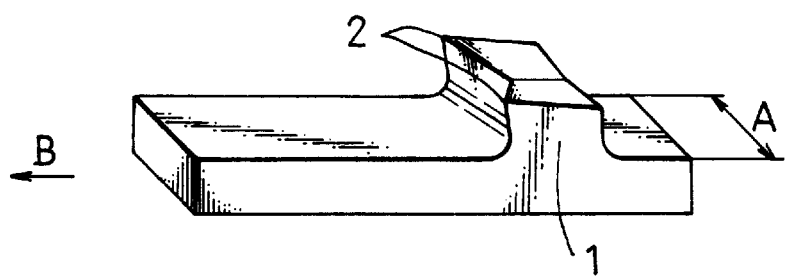
FIGS. 19a and 19b show respectively in a fragmentary perspective view and a front elevation a blade edge part in another embodiment according to the present invention.
Figure 19B:
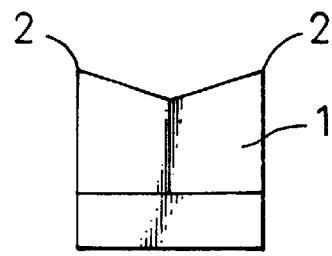

FIG. 19 shows still another embodiment of the present invention, in which both side edges of the respective cutting teeth 1 are formed to be the biting teeth 2 projecting in the cutting direction B and the top surface of the cutting teeth 1 is inclined in the direction intersecting at right angles the cutting direction B, while, in FIG. 19, the inclination is so made as to lower the middle portion of the top surface in the direction intersecting at right angles the cutting direction B. With this formation, the angle of the biting teeth 2 formed to project in the cutting direction B at both side edges of the cutting teeth 1 can be sharpened, the wood C can be bit more sharply as compared with the biting teeth 2 provided without being angled at the top surface of the cutting teeth 1 to project in the cutting direction B, and the cut surfaces can be attained without any "fluff" or "return" more effectively prevented from occurring.

Figure 20:
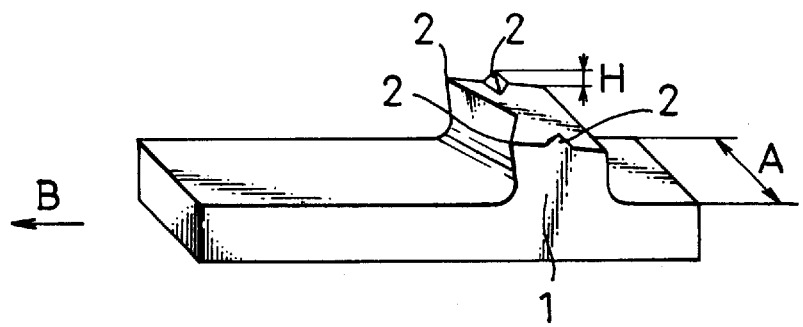
FIG. 20 shows in a fragmentary perspective view a blade edge part in another embodiment according to the present invention.

Further, FIG. 20 shows a further embodiment of the present invention, in which the biting teeth 2 are provided at the top surface and both side edges of the respective cutting teeth 1. In FIG. 20, the height of the respective biting teeth 2 and the height of the edges of the cutting teeth 1 are made to have a difference H of 0.05 to 0.50 mm (the biting teeth 2 being higher than the cutting teeth 1). With this formation, the fibers in the wood C are to be by the four biting teeth 2, so that blade edges of the biting teeth 2 are made less wear and are prolonged in the life.

Figure 21A:
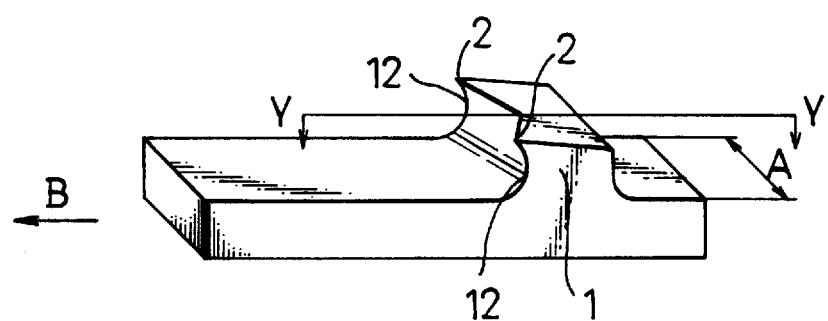
FIGS. 21a and 21b show respectively in a fragmentary perspective view and its Y—Y line sectioned view a blade edge part of in another embodiment according to the present invention.
Figure 21B:
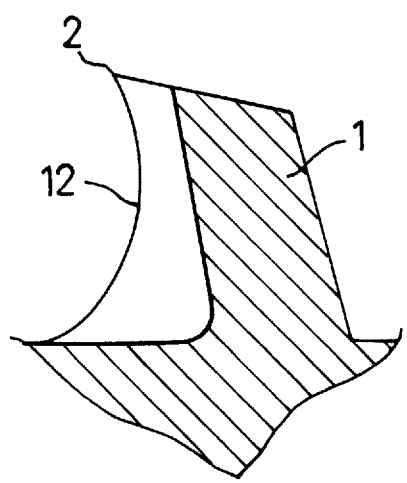
Figure 22A:
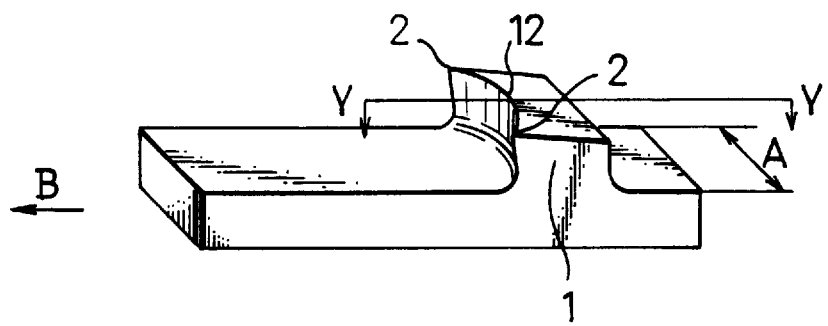
FIGS. 22a and 22b show respectively in a fragmentary perspective view and its Y—Y line sectioned view a blade edge part in another embodiment according to the present invention.
Figure 22B:
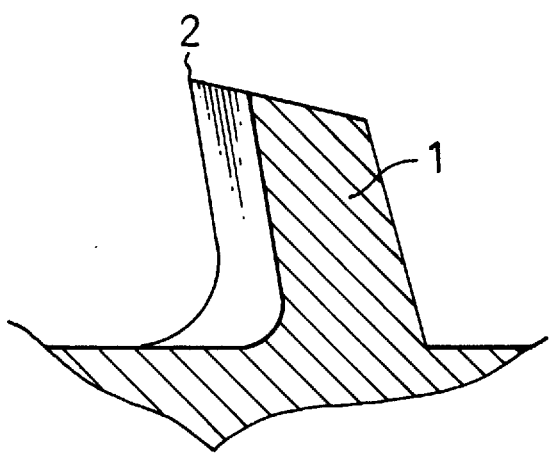

In FIGS. 21 and 22, there are shown further embodiments of the present invention, in which the blade edges are improved in the strength by forming the blade edges of the cutting teeth 1 to be arcuated (that is, rounded) to retract in the direction opposite to the cutting direction B. Here, in the embodiment of FIG. 21, the stripping surface of the cutting teeth 1 is shaped to be arcuate retracting in the direction opposite to the cutting direction, while in the embodiment of FIG. 22 the blade edge shape of the cutting teeth 1 in the direction intersecting at right angles the cutting direction B is arcuated to be indented in the direction opposite to the cutting direction B. In these drawings, a reference numeral "12" denotes the arcuated part.

Figure 23:
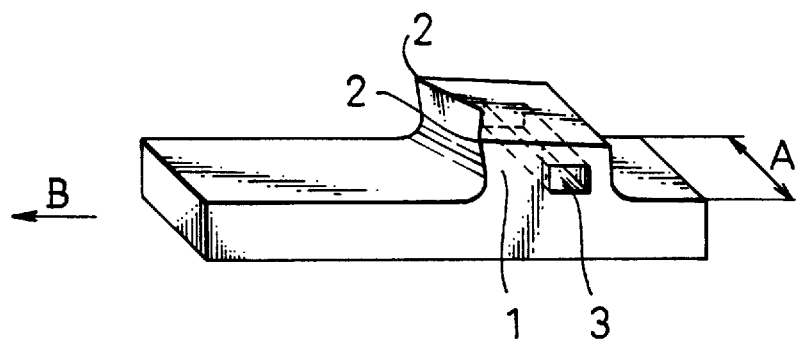
FIG. 23 is a fragmentary perspective view of a blade edge part in another embodiment of the present invention.

In FIG. 23, still another embodiment of the present invention is shown, in which a hole 3 is formed in side wall of the cutting teeth 1. In the embodiment shown in FIG. 23, the hole 3 is formed to penetrate through both side surfaces of the cutting teeth 1. with this formation of the hole 3 in the side surface of the cutting teeth 1, the chips occurring during the cutting and entering between the side surfaces of the teeth and the object to be cut are caused to escape into the hole 3, so that the cutting resistance can be reduced.

Figure 24:
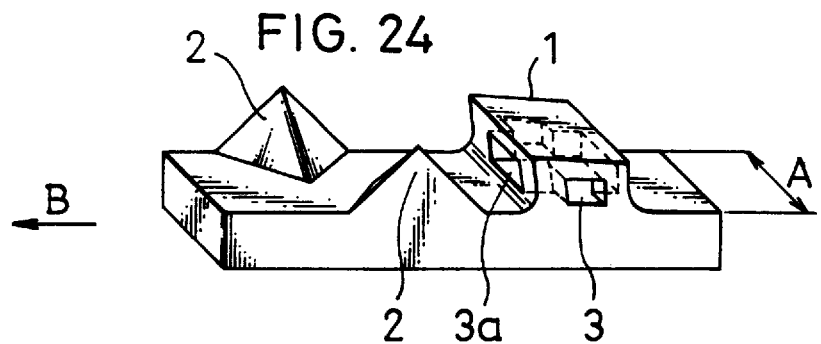
FIG. 24 is a fragmentary perspective view of a blade edge part in another embodiment of the present invention.

Here, it is possible to provide a further hole 3a in the stripping surface in addition to the hole 3 made in the side surfaces of the cutting teeth 1 as shown in FIG. 24, and to communicate the hole 3a with the hole 3. In this case, it is possible not only to reduce the cutting resistance with the produced chips during the cutting caused to escape into the hole 3 in the side surface of the cutting teeth 1 but also to prevent the chips from staying on the stripping surface to cause any clogging since the chips can also escape into the hole 3a made in the stripping surface. Because of the communication with the hole 3a, the escape of the chips produced during the cutting into the hole 3 in the side walls of the cutting teeth 1 enables it possible to reduce the cutting resistance.

Figure 25A:
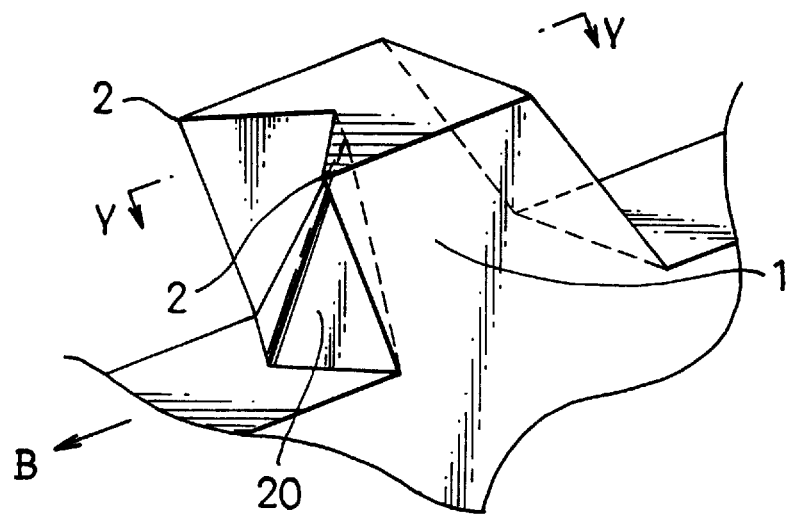
FIGS. 25a and 25b show respectively in a fragmentary perspective view and its Y—Y line sectioned view a blade edge part in another embodiment according to the present invention.
Figure 25B:
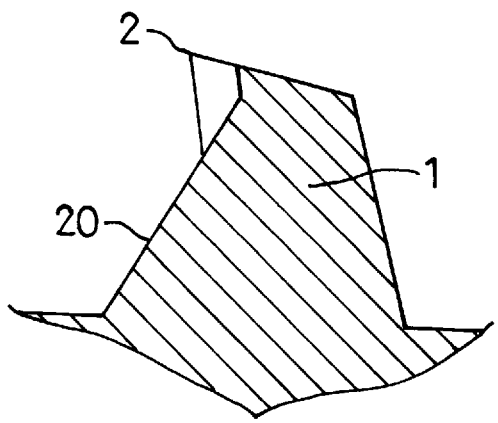

In FIGS. 25a and 25b, an embodiment allowing the chips cut by the cutting teeth 1 to be smoothly discharged without staying in front of the cutting teeth 1 is shown. That is, both side edges of the cutting teeth 1 are provided with a lateral stripping angle so as to constitute the biting teeth 2, whereby the forward face of the cutting teeth 1 is V-shaped or U-shaped. While such V-shaped or U-shaped front face of the cutting teeth 1 may happen to cause the chips to stay in front of the cutting teeth 1, a relief edge 20 is formed at middle portion between the side edges of the cutting teeth 1, in the embodiment of FIG. 25. Further, this chip relief edge 20 is formed in a triangular pyramid, a top end of which is positioned not to reach the top surface of the cutting teeth 1 but to be slightly below the top surface (about 0.05 to 0.5 mm below). With this formation, the chips produced during the cutting are caused to be discharged along the relief edge 20 towards both side surfaces of the cutting teeth 1, and the smooth cutting can be attained.

Figure 26A:
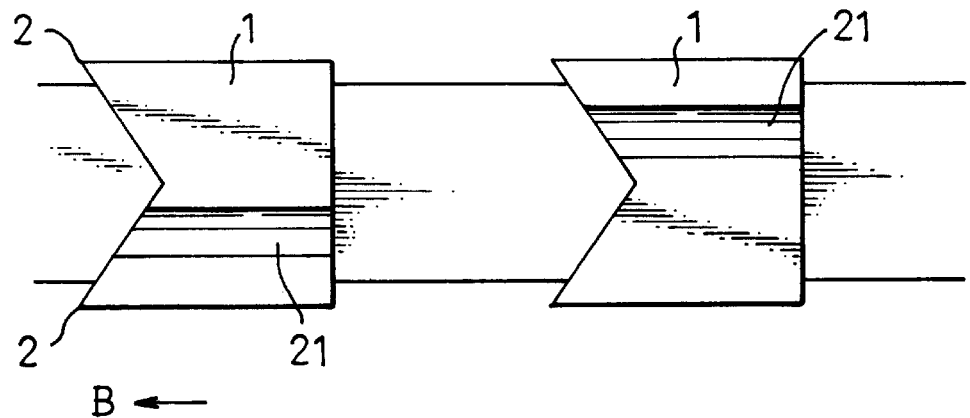
FIGS. 26a through 26c show respectively in a fragmentary plan view, similar explanatory view for a chip flow and perspective view a blade edge part in another embodiment of the present invention.
Figure 26B:
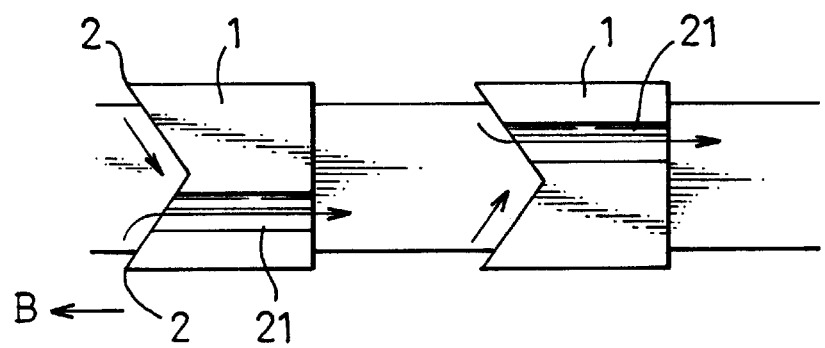
Figure 26C:
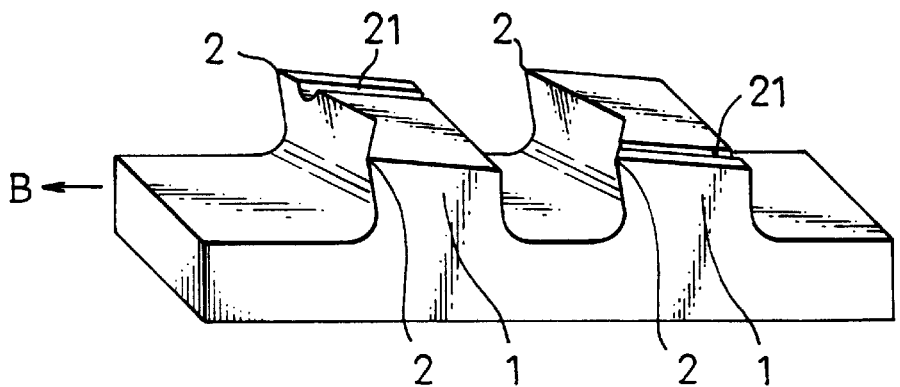

In FIGS. 26a to 26c, there is shown an embodiment in which the cutting teeth 1 the front face of which is V-shaped or U-shaped to constitute the biting teeth 2 with both side edges of the cutting teeth 1 are provided in the top surface of the cutting teeth 1 with a chip relief groove 21. As shown in FIG. 26a, the chip relief groove 21 is provided in the respective cutting teeth 1 as alternately deviated to both sides at every one of the cutting teeth 1 arranged in the cutting direction B, so that a flow of the chips upon the cutting will be as shown by arrows in FIG. 26b to be discharged without staying in front of the cutting teeth 1 and the smooth cutting can be performed. Here, while the provision of the chip relief groove 21 in the top surface of the cutting teeth 1 causes the cutting not to be performed at the groove 21, the deviation of the grooves 21 alternately to both sides in the cutting direction B enables it possible to cut any uncut portion at the chip relief groove 21 of one cutting tooth 1 with the next coming cutting tooth 1.

Figure 27A:
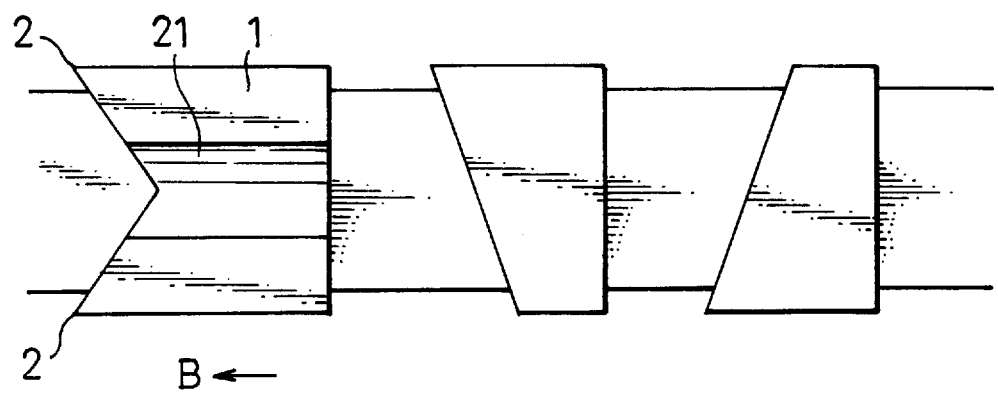
FIGS. 27a through 27c show respectively in a fragmentary plan view, similar explanatory view for chip flow and a fragmentary perspective view a blade edge part in another embodiment of the present invention.
Figure 27B:
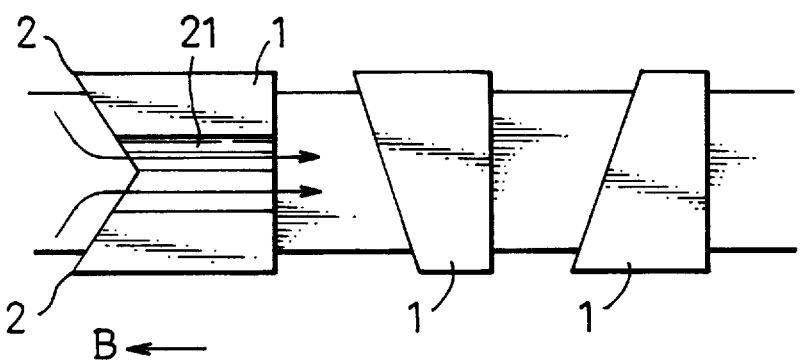
Figure 27C:
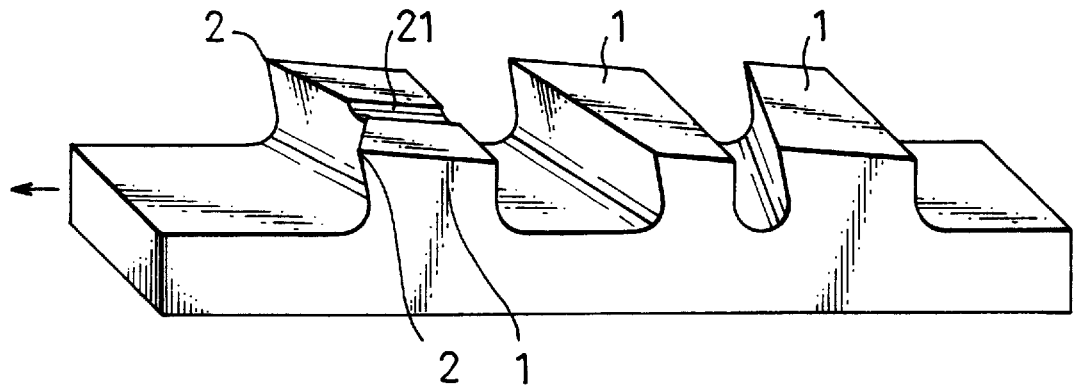

In FIGS. 27a to 27c, an example in which, in providing the chip relief groove 21 in the top surface of the cutting teeth 1 the front face of which is V-shaped or U-shaped, the groove 21 is provided in the center of the top surface of the cutting teeth 1. In this case where the chip relief groove 21 is provided in the center of the top surface of the cutting teeth 1, such cutting teeth 1 having different stripping angles as shown in FIG. 27a and referred to as alternate teeth are provided behind the cutting tooth 1 having the V-shaped or U-shaped front face. In this case, the chips produced upon the cutting by the cutting teeth 1 having the V-shaped or U-shaped front face are discharged through the chip relief groove 21 as shown by arrows in FIG. 27b. While the chip relief groove 21 provided in the center of the top surface of the cutting teeth 1 causes the cutting not performed at the chip relief groove 21, any uncut portion due to the chip relief groove 21 is to be cut by the next coming cutting teeth 1 of the different stripping angles and regarded as the alternate teeth disposed behind the cutting teeth 1 having the V-shaped or U-shaped front face.

Figure 28A:
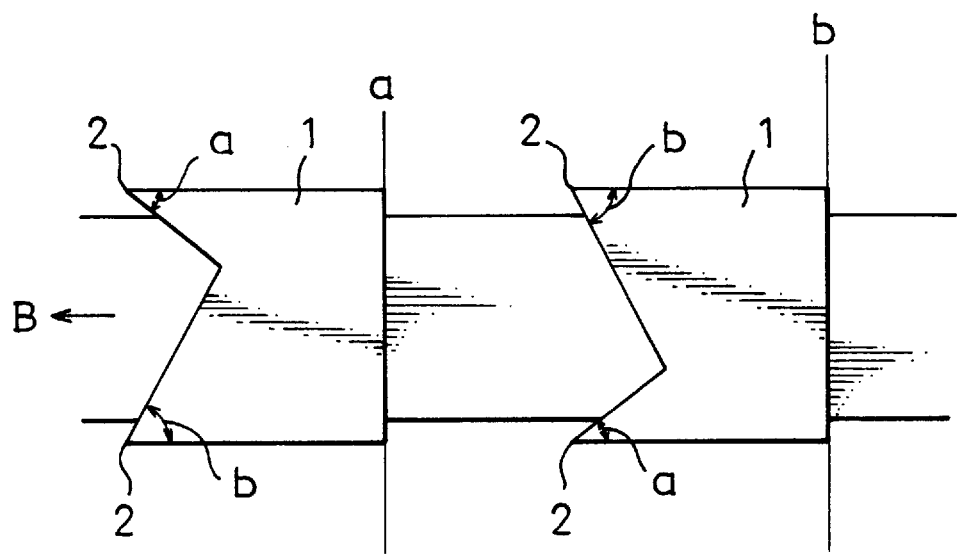
FIGS. 28a and 28b show respectively in a fragmentary perspective view and similar explanatory view for a cutting mechanism a blade edge part in another embodiment according to the present invention.
Figure 28B:
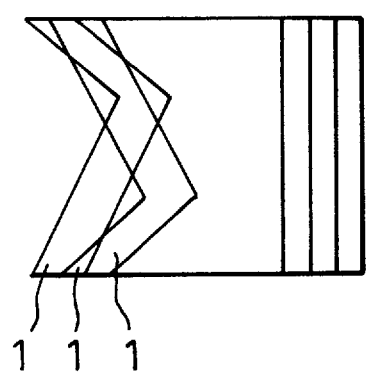

In FIGS. 28a and 28b, still another embodiment of the present invention is shown, in which the cutting teeth 1 the forward edge of which is V-shaped or U-shaped to constitute the biting teeth 2 at both side edges of the cutting teeth 1 as shown in FIG. 28a are so made as to shift the bottom portion of the V or U shape in the respective cutting teeth 1 in respect of the cutting direction. That is, angles a and b at both side edges of each V-shaped or U-shaped blade edge 1a are made mutually different, and thereby the bottoms of the V or U shape of the respective cutting teeth 1 sequentially arranged are positioned as shifted in the cutting direction. In the present embodiment, as seen in FIG. 28b, other portion than the bottom portion of the next coming cutting teeth 1 is to be contributive to the cutting in advance of the bottom portion of the V or U shape, so that no cutting is to be achieved at the bottom portion of the V or U shape, and eventually the required cutting power can be minimized. Here, the angles a and b of FIG. 28a should be suitably 65° to 25°. The cutting of the objective wood C with the saw blade of the above formation is performed in such sequence as shown in FIGS. 29a to 29e. That is, a partial cut 5 is formed by the cutting tooth 1 having the biting teeth 2 at both side edges and V-shaped or U-shaped front edge, as in FIG. 29a. In this case, as the bottom of the V or U shape of the V-shaped or U-shaped cutting teeth 1 is shifted from the center in the cutting direction, a cut portion by the bottom of the V or U shape of the cutting tooth 1 is shifting in the width direction of the cut 5, as in FIG. 29a. Next, the cutting by the second cutting tooth 1 is carried out as in FIG. 29b since the bottom of the V or U shape of this second cutting tooth 1 is shifted from that of the first cutting tooth 1. Here, the cutting advances as in FIGS. 29a and 29b as the saw blade moves to the position a and to the position b of FIG. 28a, and the positions a and b of FIG. 28a correspond to FIGS. 29a and 29b, respectively. In similar manner, the cutting is made next by the third cutting tooth 1 as in FIG. 29c, and then by the fourth cutting tooth 1 as in FIG. 29d. FIG. 29e shows the state of the cutting completed, showing the state where no "fluff" or "return" is occurred. In FIGS. 29a to 29d, the first cutting tooth is denoted by 1a, the second cutting tooth by 1b, the third cutting tooth by 1c and the fourth cutting tooth by 1d.

Figure 30A:
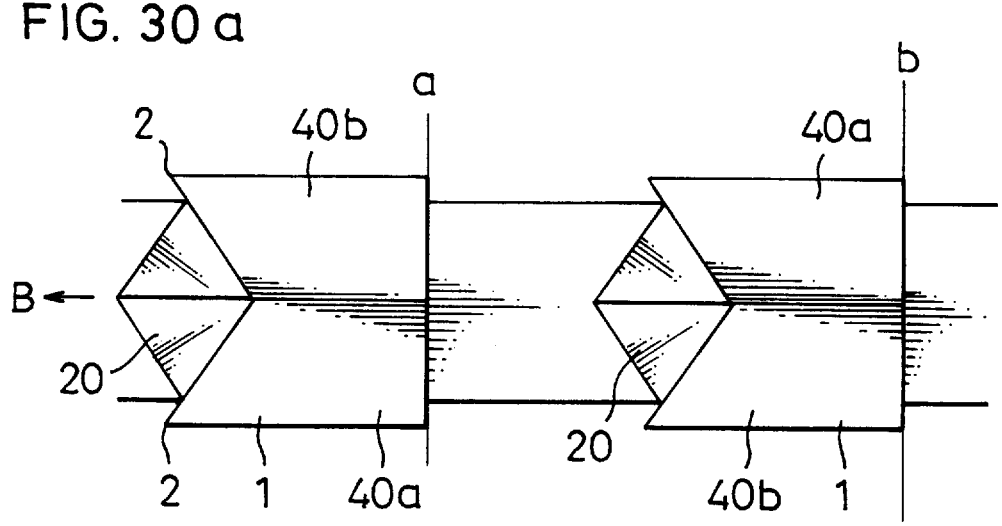
FIGS. 30a through 30c show respectively in a fragmentary plan view, a front elevation and an explanatory plan view for a cutting mechanism a blade edge part in another embodiment of the present invention.
Figure 30B:
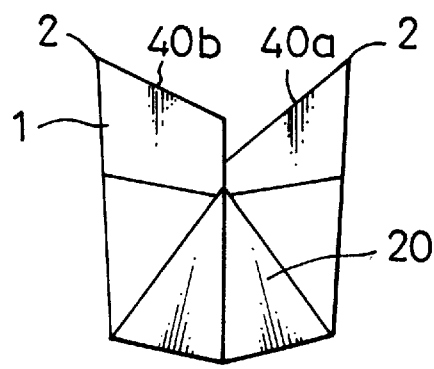
Figure 30C:
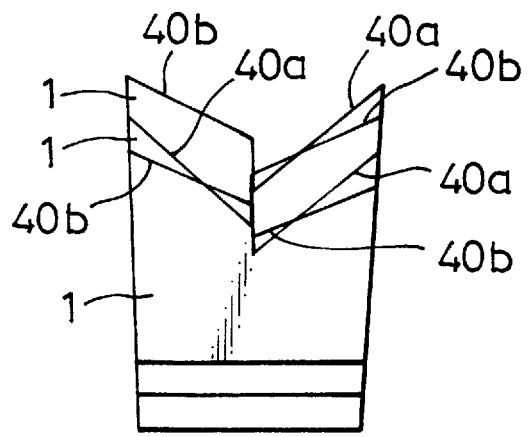

In FIGS. 30a to 30c, still another embodiment of the present invention is shown, in which the respective cutting teeth 1 are V-shaped or U-shaped in the cutting direction at the forward face as shown in FIG. 30a, so that both side edges of these cutting teeth 1 constitute the biting teeth 2. Moreover, in the present embodiment, the top surface of these cutting teeth 1 is inclined to be higher on both sides of the respective cutting teeth 1 in the direction intersecting at right angles the cutting direction, and the position of the bottom in the inclination of the top surface of the respective cutting teeth 1 is shifted in the cutting direction. In concrete, the angle of inclination is so varies for both inclined surface portions that a lower end of one inclined surface portion 40b will be disposed lower than a lower end of the other inclined surface portion 40a. That is, the inclined surface portion 40a on one side forms a steep slope while the inclined surface portion 40b on the other side of the top surface forms a gentle slope. Here, the successive cutting teeth 1 are disposed in alternate relationship so that, in the cutting direction, the gentle inclined surface portion 40b of the top surface of each rear positioned cutting tooth 1 is disposed behind the steep inclined surface portion 40a of the top surface of each front positioned cutting tooth 1, while the steep inclined surface portion of the top surface of each rear positioned cutting teeth 1 is positioned behind the gentle inclined surface portion 40b of the top surface of each front positioned cutting tooth 1. In this manner, the positional relationship between the steep inclined surface portion 40a and gentle inclined surface portion 40b is varied alternately in the cutting direction B, and the bottoms of the inclined surface portions at the top surface of the successive cutting teeth 1 are positionally displaced. Consequently, the cutting is to be performed in the sequence of FIGS. 31a→31b→31c→31d→31e, in which, as shown in FIG. 30c, the cutting is made by a part of the next coming cutting tooth 1 at its lower end of the gentle inclined surface portion 40b in advance of the V-shaped or U-shaped bottom of the cutting tooth 1 at the lower end of the steep inclined surface portion 40a, so that the cutting will not be performed at the bottom of the V or U shape at the forward end at the lower end of the steep inclined surface portion 40a, and the required cutting power can be eventually minimized. In FIG. 31, by the way, a reference la denotes the first cutting tooth which cuts off the objective wood C to form a partial cut 5 as in FIG. 31a, while a reference 1b denotes the second cutting tooth which forms such partial cut 5 as in FIG. 31b. Here, the cutting advances as in FIGS. 31a and 31b respectively as the saw blade shifts through positions a and b of FIG. 30a, and the positions a and b of FIG. 30a correspond respectively to FIGS. 31a and 31b. Further, a reference 1c denotes the third cutting tooth for forming such partial cut 5 as in FIG. 31c, and a reference 1d denotes the fourth cutting tooth for forming such partial cut 5 as in FIG. 31d. FIG. 31e shows the state in which the cutting is completed, where the cutting is shown to have been attained without occurrence of any "fluff" or "return".

Figure 32A:
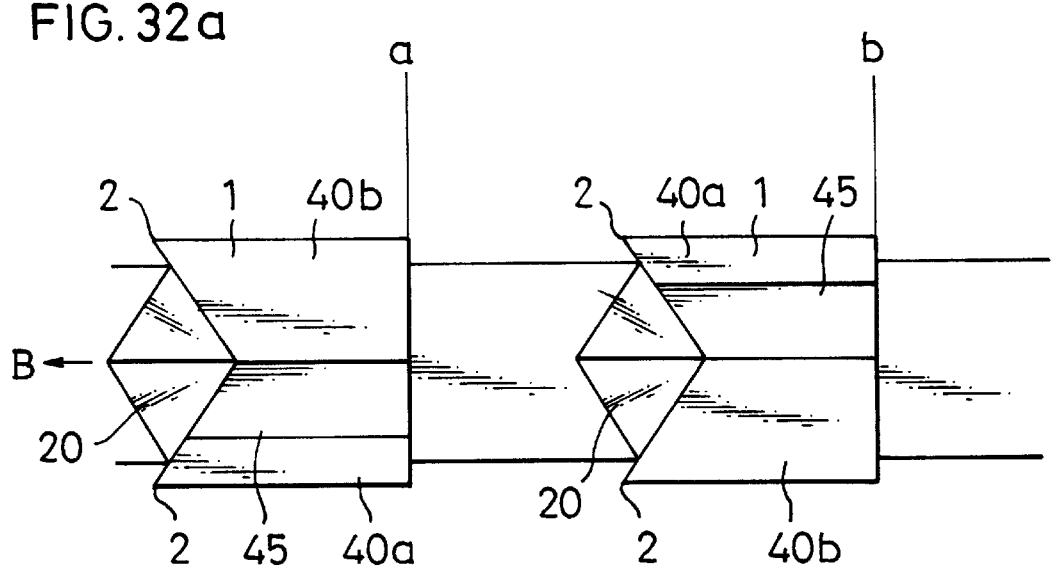
FIGS. 32a through 32c show respectively in a fragmentary plan view, front elevation and explanatory plan view for a cutting mechanism a blade edge part in another embodiment of the present invention.
Figure 32B:
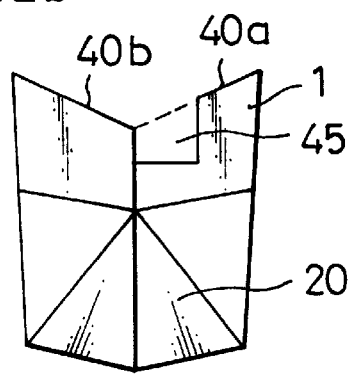
Figure 32C:
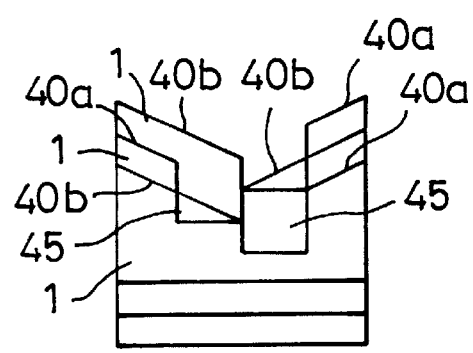

In FIGS, 32a through 32c, there is shown another embodiment of the present invention, in which the front face of the respective successive cutting teeth 1 is V-shaped or U-shaped in the cutting direction as shown in FIG. 32a so that both side edges of the respective cutting teeth 1 will constitute the biting teeth 2. Further in this embodiment, the top surface of the cutting teeth 1 is inclined to be higher on both sides of the cutting teeth 1 in the direction intersecting at right angles the cutting direction, and the bottom position of the inclined surface portions of the successive cutting teeth 1 is displaced with respect to the cutting direction. In concrete, a groove 45 is provided in one side inclined surface portion 40a at the top surface of each front positioned cutting tooth 1 in the cutting direction B, and the groove 45 is provided in the other side inclined surface portion 40b at the top surface of each rear positioned cutting tooth 1. By alternately the inclined surface portion of providing the groove 45 for every cutting tooth 1 in the cutting direction B, the position of the bottom of the inclined surface portions at the top surface of the successive cutting teeth 1 is displaced with respect to the cutting direction. Here, the width of the groove 45 should preferably be made about ⅙ to ¼ of the whole width of the cutting teeth 1. Now, the cutting is performed in the sequence of FIGS. 33a→33b→33c→33d→33e, in which the part uncut due to the groove 45 is to be cut at part having no groove 45 of the next cutting tooth 1, and the cutting is not performed at the part of the groove 45 which is the bottom of the inclined surface portions at the top surface of the cutting teeth 1, and eventually the required cutting power can be minimized. In FIG. 33, the reference la denotes the first cutting tooth for cutting the object wood C to form the partial cut 5 as in FIG. 33a, and a reference 1b denotes the second cutting tooth for forming such partial cut 5 as in FIG. 33b. Here, the cutting advances as in FIGS. 33a and 33b as the saw blade shifts through the positions a and b in FIG. 32a, and the positions a and b of FIG. 32a correspond respectively to FIGS. 33a and 33b. Further, 1c denotes the third cutting tooth for forming such partial cut 5 as in FIG. 33c, and 1d denotes the fourth cutting tooth for forming such partial cut 5 as in FIG. 33d. FIG. 33e shows the state where the cutting is completed, without occurrence of any "fluff" or "return".

Figure 34:
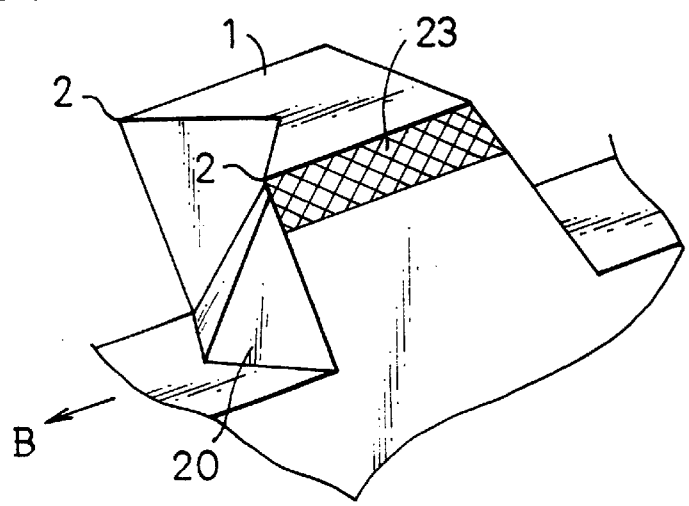
FIG. 34 is a fragmentary perspective view of a blade edge part in another embodiment of the present invention.

In FIG. 34, there is shown another embodiment of the present invention, in which the cutting teeth 1 are provided on side surfaces with a finely uneven zone 23 (shown as cross-hatched in FIG. 34). With this provision of the finely uneven zone 23 on the side surfaces of the cutting teeth 1, it is made possible to perform a finishing work of the side surfaces of the cut simultaneously with the cutting by means of the cutting teeth 1 with the finely uneven zone 23 made to act as a file, and the cut is made fine at the side surfaces.

Figure 35A:
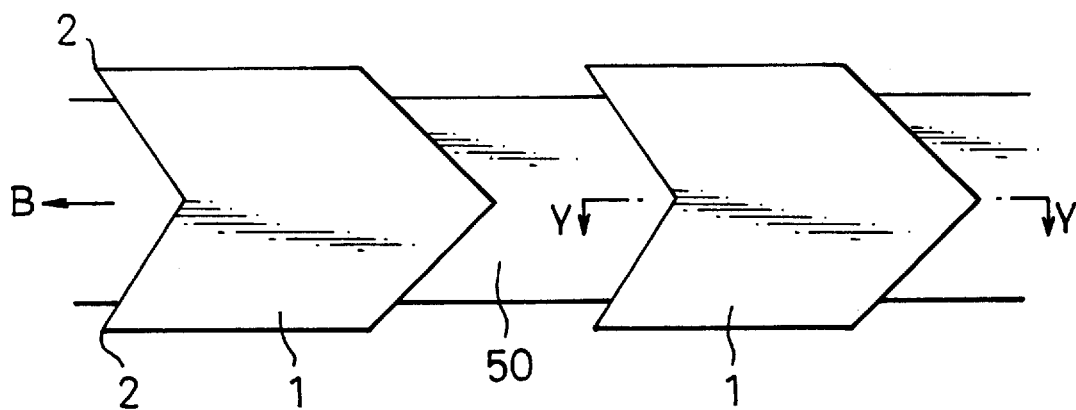
Figure 35C:
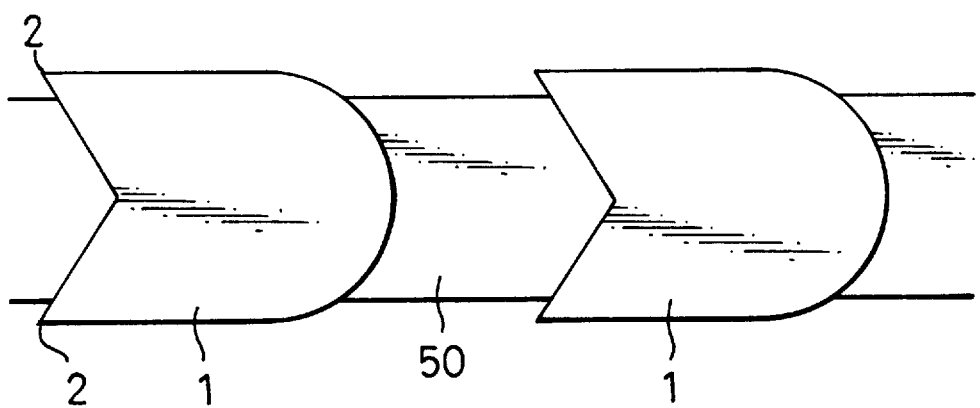
Figure 35B:
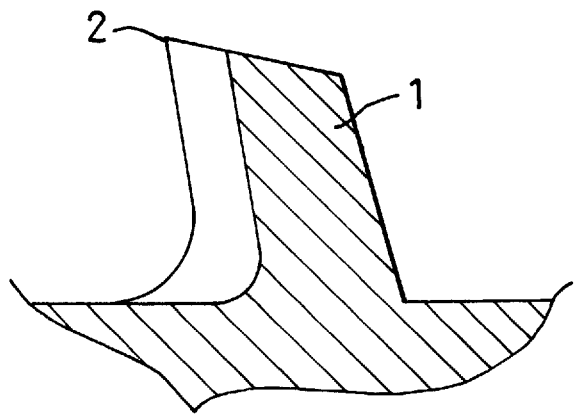

FIGS. 35a to 35c show still another embodiment of the present invention, in which rear edge opposing the V-shaped or U-shaped biting teeth 2 made at the front edge of the respective cutting teeth 1 is made non-linear. In FIG. 35a, there is shown one in which the rear edge of each cutting tooth 1 is cut into a V-shape and, in FIG. 35c, there is shown another cutting tooth 1 having a U-shaped rear edge. With such rear edges made non-linear, chip receiving parts 50 are increased in the volume so as to prevent any clogging from occurring.

Figure 36A:
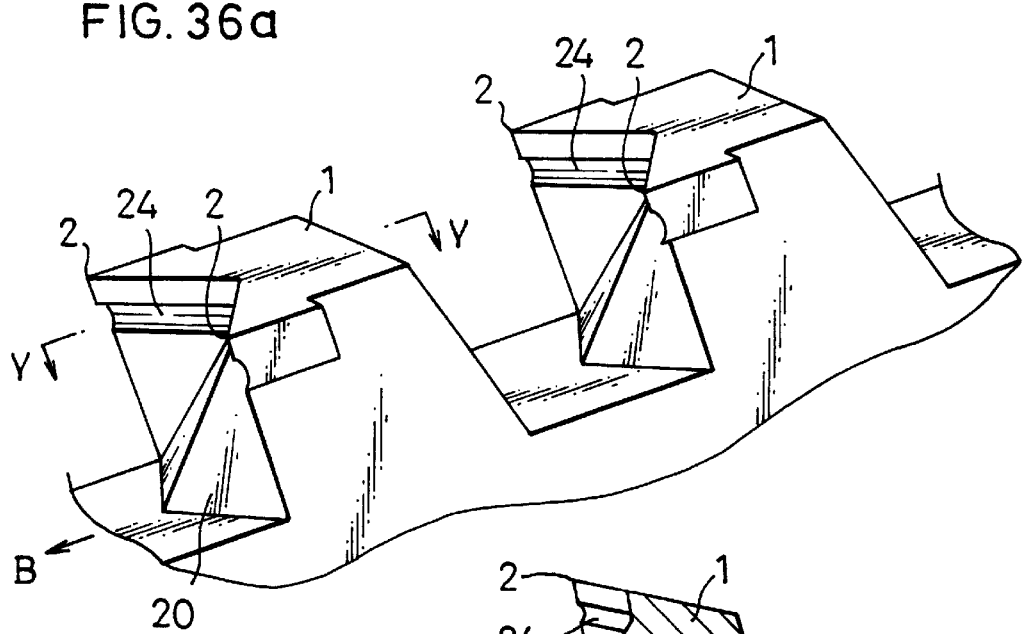
FIGS. 36a and 36b show respectively in a fragmentary perspective view and its Y—Y line section a blade edge part in another embodiment of the present invention.
Figure 36B:
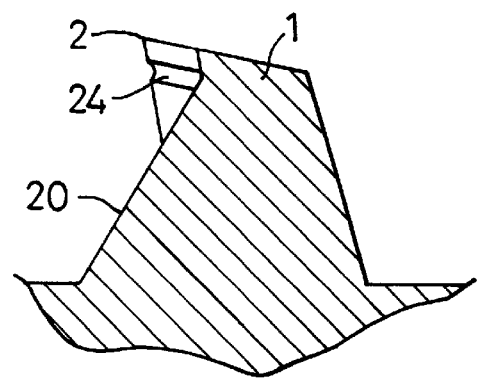

In FIGS. 36a and 36b, there is shown still another embodiment of the present invention, in which a groove 24 is provided in the stripping surface of the respective cutting teeth 1. With such provision of the groove 24 in the stripping surface, it is made possible to separate the chips produced during the cutting so that the chips are eventually caused to be produced discontinuously but separately, whereby the discharge of the chips to the side surfaces by means of the chip relief edge 20 can be made easier, and the clogging can be prevented.

Figure 37:
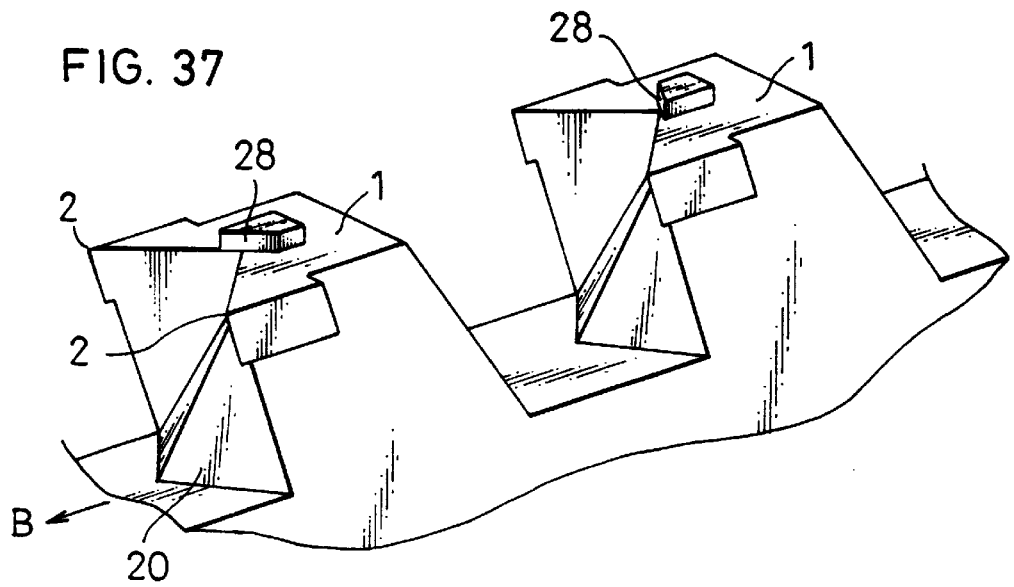
FIG. 37 is a fragmentary perspective view in another embodiment of the present invention.

In FIG. 37, still another embodiment of the present invention is shown, in which the front edge of the respective cutting teeth 1 is V-shaped or U-shaped, and further a biting tooth 28 is provided on the top surface of the tooth at bottom portion of the V or U shape each cutting tooth 1. The biting teeth 28 in this embodiment are alternately differentiated in the direction of inclination so that the inclination of the biting tooth 28 on the front cutting tooth 1 and the inclination of biting tooth 28 on the rear cutting tooth 1 are in mutually intersecting direction. Consequently, the cutting is initially performed by such biting teeth 28 so that the cutting is not made at the bottom of the V or U shape of the respective cutting teeth 1, and the required cutting power can be eventually minimized.

Figure 38:
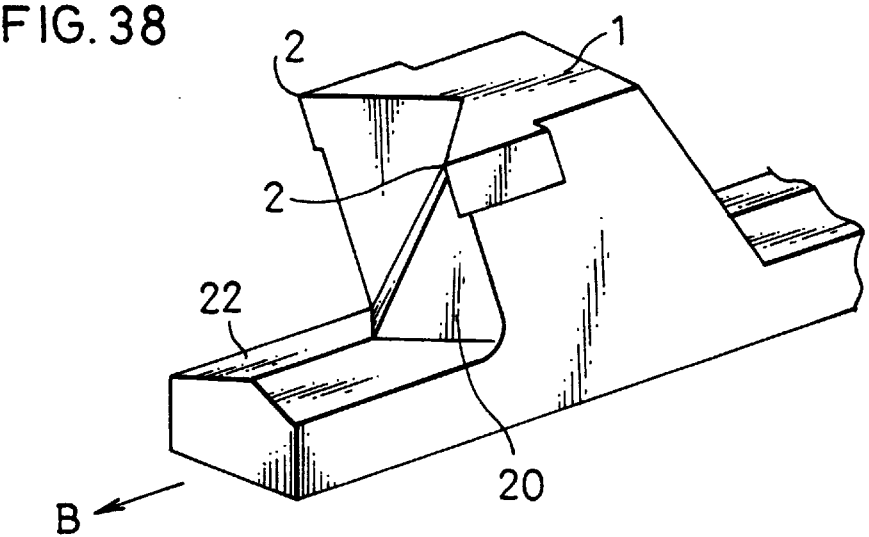
FIG. 38 shows in a fragmentary perspective view a blade edge part in another embodiment of the present invention.

In FIG. 38, another embodiment of the present invention is snown, in which top surface of base body 22 at positions where the cutting teeth 1 are not provided to project is sloped to be lower on side edges. While in the embodiment of FIG. 38 the top surface of the base body 22 is sloped to be substantially mountain-shaped in section so as to be high in the center but to be low at both side edges, a one-sided slope may also be employed to render one side edge of the base body 22 to be higher but the other side edge to be lower. With such sloping of the surface of the base body 22 at the positions having no cutting teeth 1 to be lower on the both side edges, the chips can be discharged in smooth manner along the slope of the base body 22.

Figure 39A:
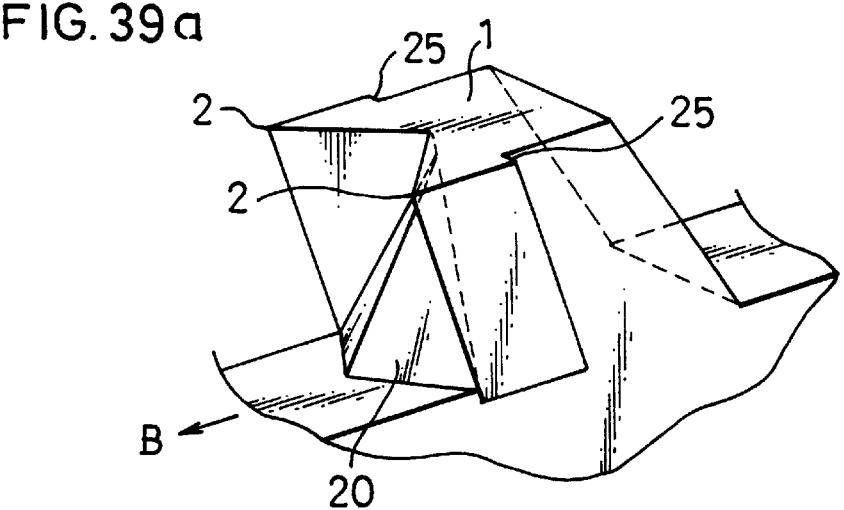
FIGS. 39a and 39b show respectively in a fragmentary perspective view and its plan view a blade edge part in another embodiment of the present invention.
Figure 39B:
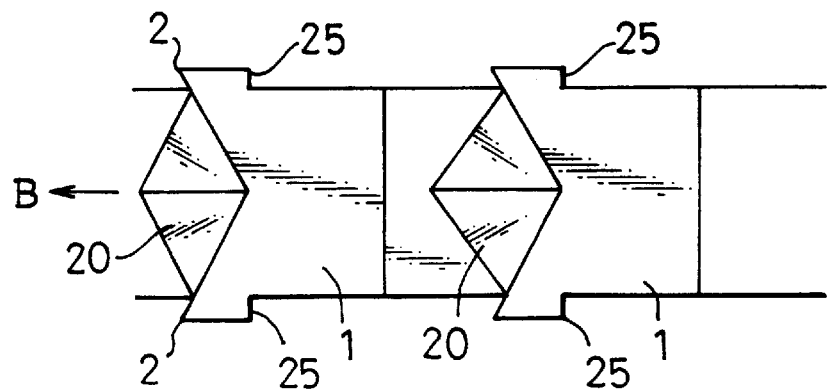

In FIGS. 39a and 39b, there is shown another embodiment of the present invention, in which each cutting tooth 1 is provided at side surfaces with a stepped part 25 or a taper in the cutting direction B. Here, the stepped part 25 should be suitably more than 0.05 mm, and should be provided to all cutting teeth 1. With such provision of the stepped part 25 or taper on the side surfaces of the respective cutting teeth 1, it is made possible to reduce contacting surface area with the wood upon the cutting, and eventually the required cutting power can be minimized.

Figure 40A:
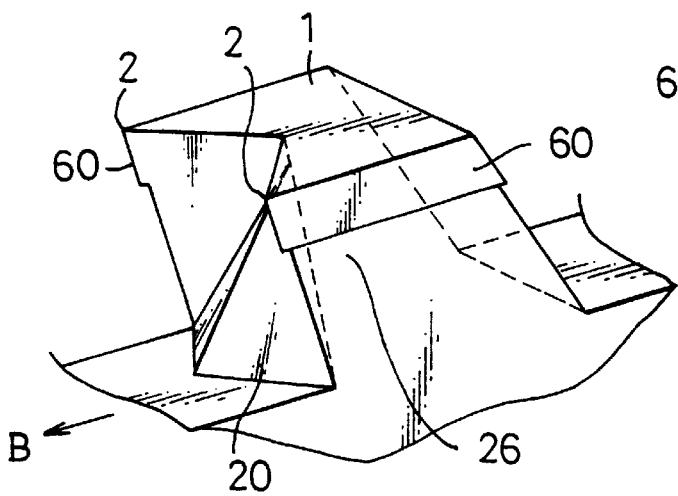
FIGS. 40a and 40b are respectively a fragmentary perspective view and its plan view of a blade edge part in another embodiment according to the present invention.
Figure 40B:
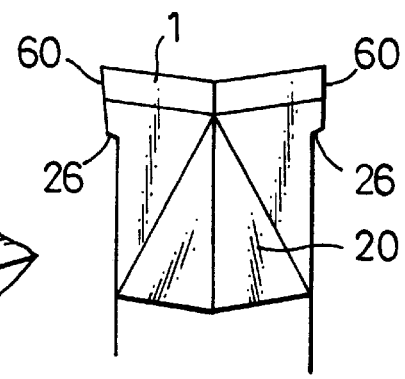

In FIGS. 40a and 40b, another embodiment of the present invention is provided, in which the biting teeth 60 are provided to project on the side surfaces of the respective cutting teeth 1 by forming a stepped part 26 on the side of the top surface of the cutting teeth 1. Here, a step between the side surface of the cutting teeth 1 and the biting teeth 60 is suitably more than 0.05 mm. With such projecting provision of the biting teeth on the side surfaces of the respective cutting teeth 1 on the top surface side by means of the stepped part 26, the contacting surface area with respect to the wood upon the cutting is reduced, and the required cutting power can be minimized.

Figure 41A:
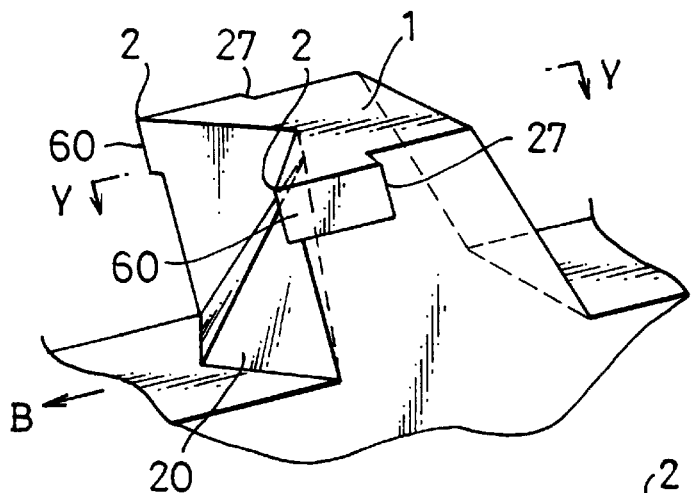
FIGS. 41a and 41b are respectively a fragmentary perspective view and its Y—Y line section of a blade edge part in another embodiment of the present invention.
Figure 41B:
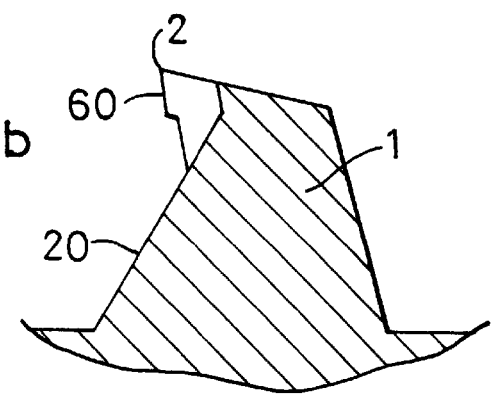

In FIGS. 41a and 41b, still another embodiment of the present invention is shown, in which the biting teeth 60 are provided to the side surfaces of the cutting teeth 1 so as to provide a stepped part 27 at a side part of each biting tooth 60. In this embodiment of FIG. 41, the stepped part 27 is formed at rear part of each biting tooth 60 for all of the biting teeth 60, and is suitably more than 0.05 mm. With such provision of the biting teeth 60 on the side surfaces of the cutting teeth 1 and the stepped parts 27 at the side part of the respective biting teeth 60, the contacting surface area with the wood upon the cutting can be reduced, and the required cutting power can be minimized.

Figure 42A:
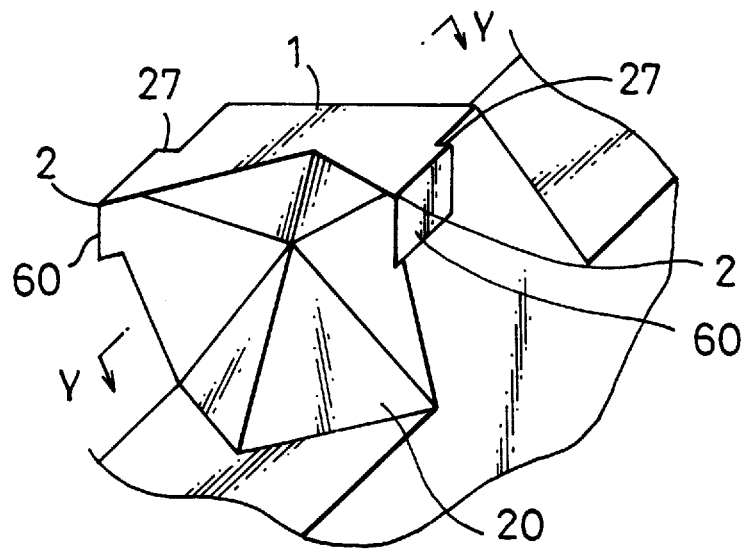
FIGS. 42a through 42c are respectively a fragmentary perspective view, its Y—Y line section and a side elevation of a blade edge part in another embodiment of the present invention.
Figure 42B:
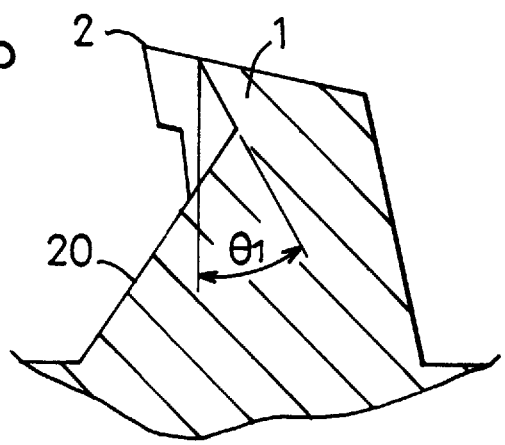
Figure 42C:
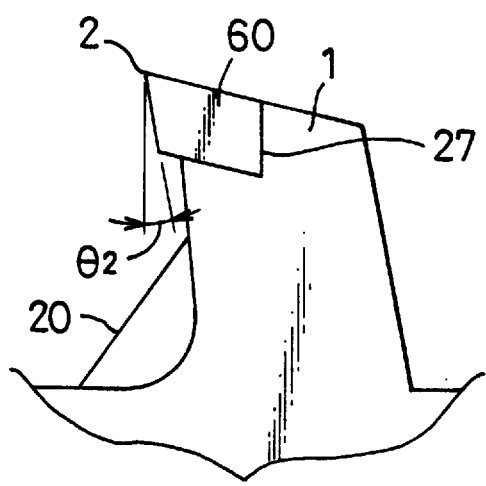

FIGS. 42a to 42c show another embodiment of the present invention, in which, in the formation having the lateral stripping angle so that both side edges of the respective cutting teeth 1 constitute the biting teeth 2 projecting in the cutting direction, the stripping angle is provided to each of the cutting and biting teeth 1 and 2, and the stripping angle provided to the cutting teeth 1 is made larger than that given to the biting teeth 2. That is, the angle $\theta_1$ shown in FIG. 42b is the stripping angle of the cutting teeth 1, while $\theta_2$ is the stripping angle of the biting teeth 2, and $\theta_1 > \theta_2$. Here, $\theta_1$ should preferably be $\theta_2 + 10°$ to $\theta_2 + 30°$, and $\theta_2$ should preferably be $-10°$ to $20°$. By rendering the stripping angle provided to the cutting teeth 1 to be smaller than the stripping angle given to the biting teeth 2 in such manner, the cutting of the side surfaces of the cut to be made in the objective wood C is to be attained with the smaller stripping angle of the biting teeth, and the "fluff" or "return" can be made hard to occur. Further, since the wood C is to be stripped by the larger stripping angle of the biting teeth 2, the cutting resistance can be minimized.

Figure 43A:
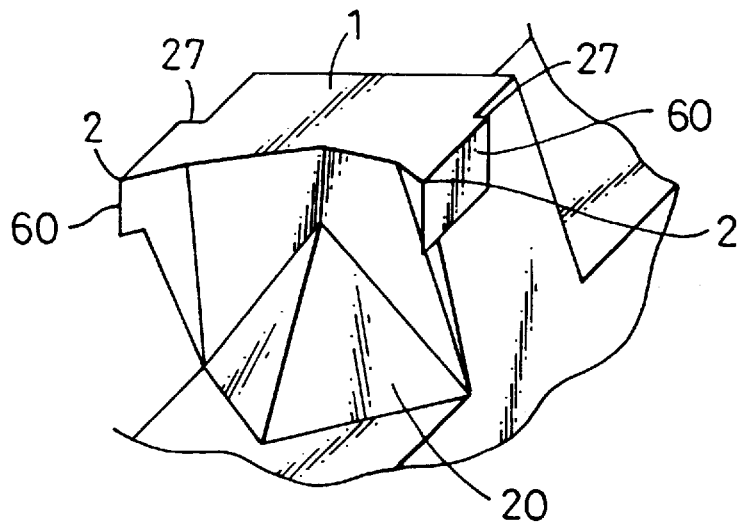
FIGS. 43a and 43b are respectively a fragmentary perspective view and its plan view a blade edge part in another embodiment of the present invention.
Figure 43B:
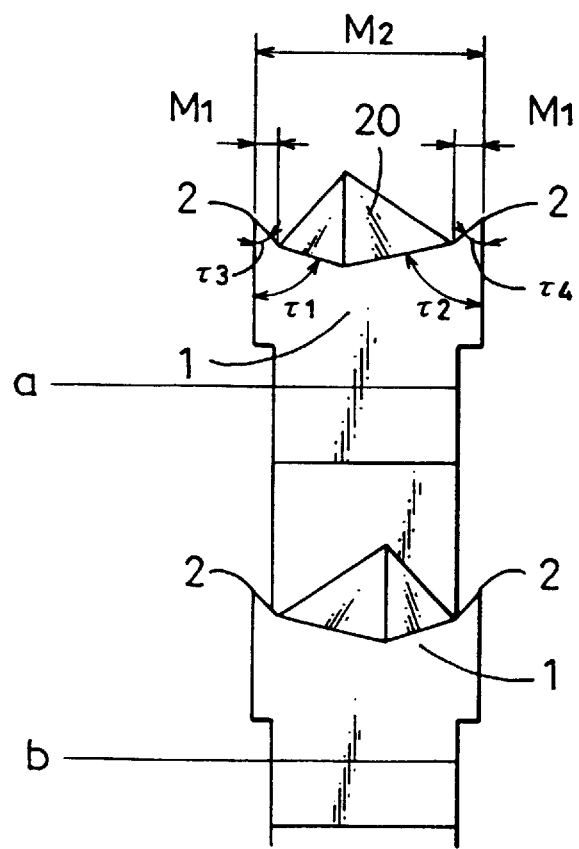

In FIGS. 43a and 43b, a further embodiment of the present invention is shown, in which, in the formation having the lateral stripping angle for constituting the biting teeth 2 projecting in the cutting direction with both side edges thereof, the blade edge angle of the cutting teeth 1 is made small than the blade edge angle of the cutting teeth 1. That is, in FIG. 43b, angles $\tau_1$ and $\tau_2$ are the blade edge angle of the cutting teeth 1 and angles $\tau_3$ and $\tau_4$ are the blade edge angle of the biting teeth 2, they are made to be $\tau_1$, $\tau_2 > \tau_3$, $\tau_4$. Here, $\tau_1$ and $\tau_2$ should preferably be 35° to 80°, and $\tau_3$ and $\tau_4$ should preferably be 30° to 65°, while $\tau_1$ should suitably be larger by 5° to 15° than $\tau_3$ and $\tau_2$ should suitably be larger by 5° to 15° than $\tau_4$. Further, it is preferable to render the width $M_1$ of the blade edge angle of the biting teeth 2 as shown in FIG. 43b to be 1/30 to 1/10 of the whole blade thickness $M_2$. By rendering in this way the blade edge angle of the biting teeth 2 to be smaller than the blade edge angle of the cutting teeth 1, the side surfaces of the cut to be made in the objective woods C are to be cut by the smaller blade edge angle of the cutting teeth 1, and the "fluff" or "return" is made hard to occur. Further, as the objective wood C is to be stripped off by the cutting teeth 1 of the larger blade edge angle than that of the biting teeth 2, the cutting resistance can be minimized. With the blade edge angle of the cutting teeth 1 made large, the blade can be improved in the strength and any chipping can be prevented.

Figure 44A:
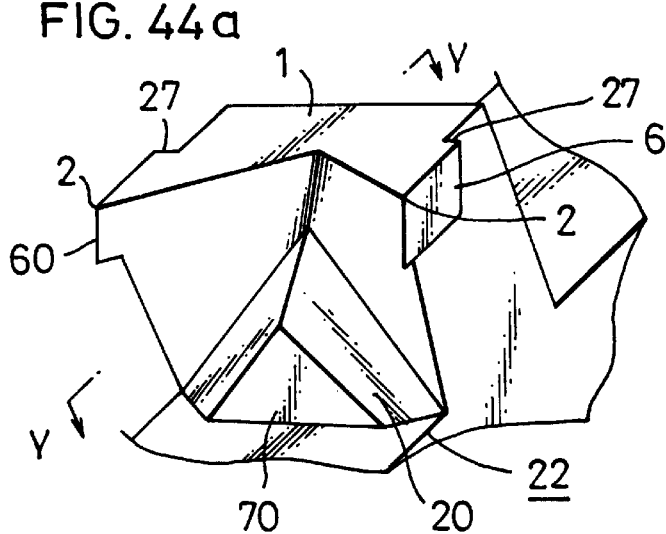
FIGS. 44a through 44d are respectively a fragmentary perspective view, its Y—Y line section, an explanatory perspective view for a chip flow, and a comparative explanatory view also for a chip flow.
Figure 44B:
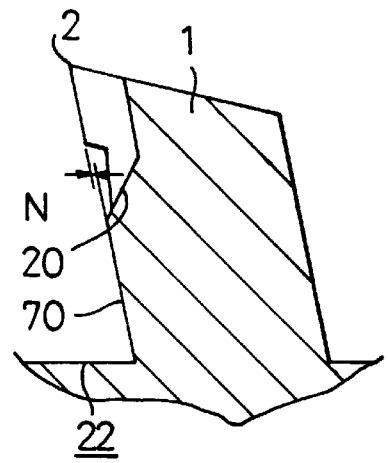
Figure 44C:
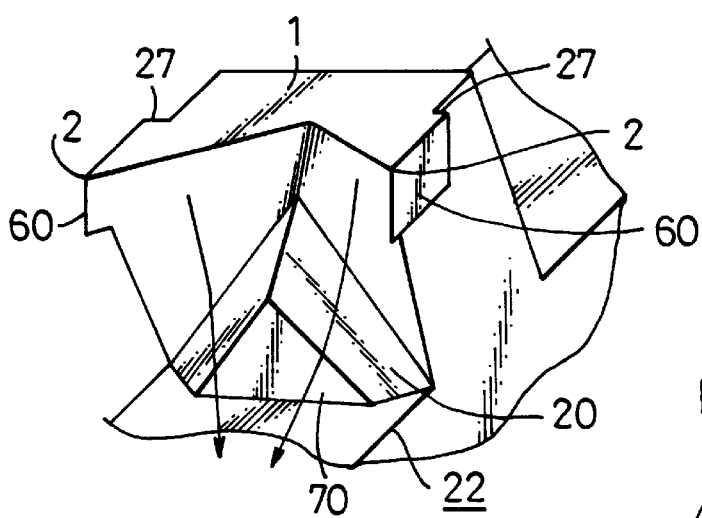
Figure 44D:
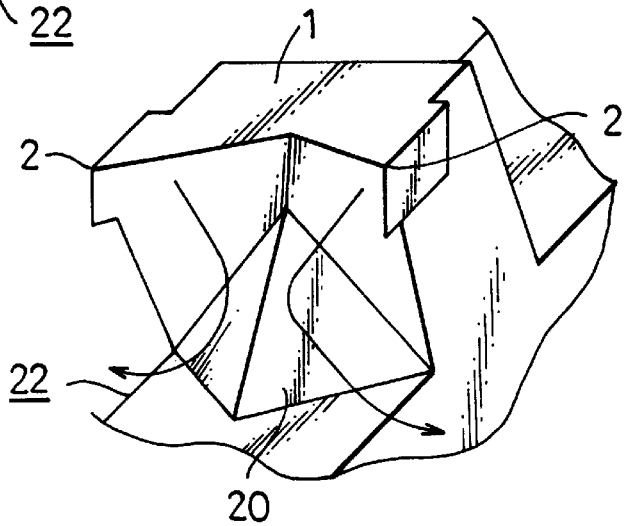

In FIGS. 44a to 44d, still another embodiment of the present invention is shown, in which, in the formation having the chip relief edge 20 provided to the middle of the front surface of the cutting teeth 1 both side edges of which constituting the biting teeth 2 for relieving by the edge 20 the chips apt to stay in front of the cutting teeth 1, the chip relief edge 20 projecting from the front surface of the cutting teeth 1 is formed to be in a triangular pyramid shape having a triangular section in the direction intersecting at right angles the cutting direction of the cutting teeth 1 and a triangular surface 70 on the front side in the cutting direction, as shown in FIG. 44a. Here, the triangular surface 70 on the front side of the chip relief edge 20 is positioned to be slightly retracted rearward from the biting teeth 2 or slightly projected forward, and a positional difference N in the forward and rearward direction between the front side of the chip relief edge 20 should preferably be ±1.0 mm. Here, in an event where the shape of the chip relief edge 20 projecting from the front surface of the cutting teeth 1 is made to be a triangular pyramid as in FIG. 44d without forming such triangular front side surface 70 as in the present embodiment, the chips apt to stay in front of the cutting teeth 1 may be relieved by the relief edge 20 but the chips will flow as indicated by arrows in FIG. 44d so as to cause a risk to arise such that the chips may enter into gaps between the base body 22 from which the cutting teeth 1 are projecting and the objective wood C so as to increase the contacting resistance between the objective wood C and the base body 22, whereas such risk can be eliminated in the present embodiment. That is, by forming the chip relief edge 20 in a frustum of triangular pyramid having a triangular section in the direction intersecting at right angles the cutting direction of the cutting teeth 1 and the triangular surface 70 on the front side in the cutting direction, as in the present embodiment, the chips apt to stay in front of the cutting teeth 1 during the cutting are made to flow as indicated by arows in FIG. 44c by such chip relief edge 20 (that is, the chips apt to stay in front of the cutting teeth 1 and caused by the chip relief edge 20 to be relieved are made to be relieved to forward side of the triangular front surface 70 of the chip relief edge 20), consequently the chips are made to stay on the base body 22 in front of the triangular front surface 70, and such chips are to be discharged to the exterior when the cutting teeth 1 come out of the objective wood C. As the chips being relieved by the chip relief edge 20 are caused to be relieved to the forward side of the triangular front surface 70 of the edge 20 so as to stay on the base body 22 in front of the triangular surface 70 but not to enter into the gaps between the base body 22 from which the cutting teeth 1 are projected and the objective wood C, and the contact resistance between the objective wood C and the base body 22 can be reduced.

Figure 45A:
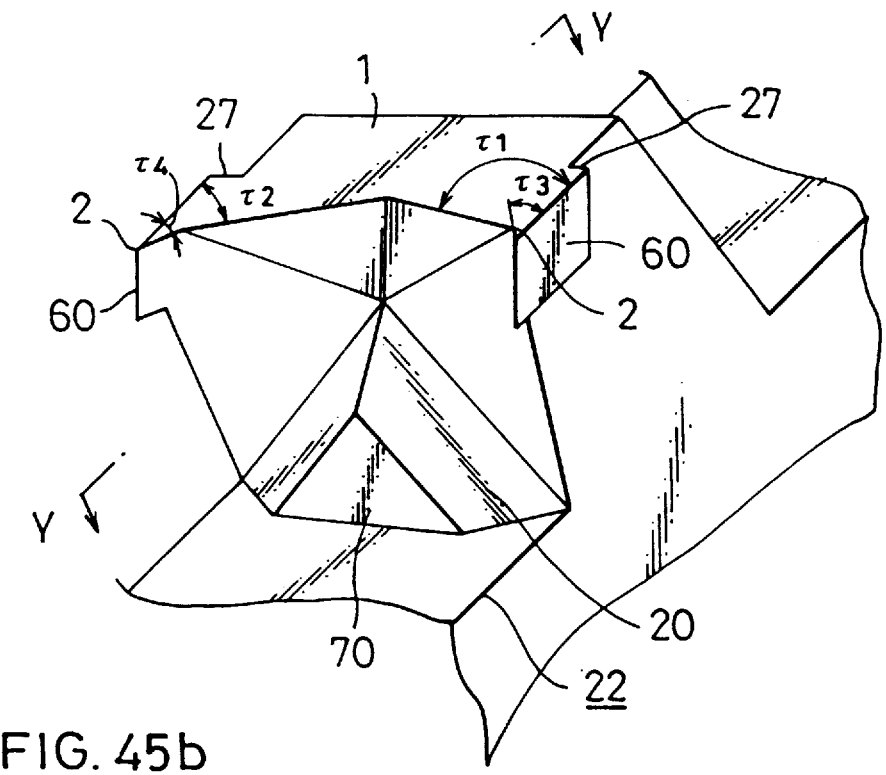
FIGS. 45a and 45b are respectively a fragmentary perspective view and its Y—Y line section of a blade edge part in another embodiment of the present invention.
Figure 45B:
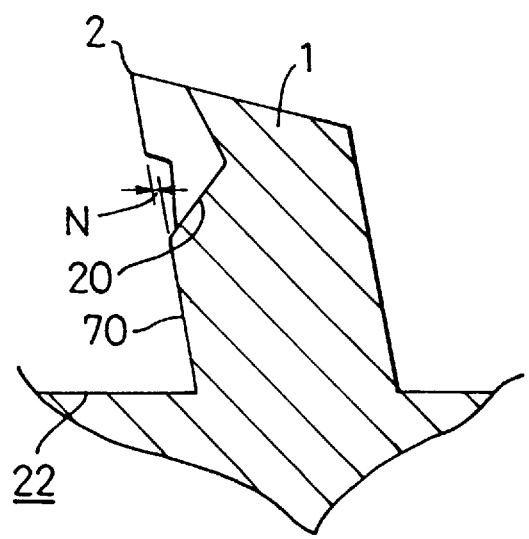

In FIGS. 45a and 45b, there is shown another embodiment of the present invention, in which, in the formation having the lateral stripping angle so as to constitute the biting teeth 2 projecting in the cutting direction with both side edges of the cutting teeth 1, the cutting and biting teeth 1 and 2 are provided respectively with the stripping angle, the stripping angle of the cutting teeth 1 is made larger than that of the biting teeth 2, the blade edge angle of the biting teeth 2 is made smaller than that of the cutting teeth 1, the chip relief edge 20 is provided to the middle of the front surface of the cutting teeth 1 up to an intermediate position of the height of the top surface of the cutting teeth 1, and this chip relief edge 20 is formed in the frustrum of triangular pyramid having the triangular section in the direction intersecting at right angles the cutting direction of the cutting teeth 1 and a triangular front surface 70 in the cutting direction. Here, the stripping angles provided respectively to the cutting and biting teeth 1 and 2 are set in the same manner as those described in the foregoing embodiment shown in FIG. 42, the blade edge angles provided respectively to the cutting and biting teeth 1 and 2 are set in the same manner as those referred to in the embodiment shown in FIG. 43, and the step in the front and rear direction between the biting tooth 2 and the triangular surface 70 is set in the same manner as that referred to in the embodiment shown in FIG. 44. In the present embodiment, further, the stripping angle provided to the cutting teeth 1 is made larger than that provided to the biting teeth 2 while the blade edge angle of the biting teeth 2 is made smaller than that of cutting teeth, so that the side surfaces of the cut through the objective wood C are cut by the biting teeth 2 of the smaller stripping angle and blade edge angle upon the cutting so as to be able to more reliably prevent the occurrence of "fluff" or "return", the cut stuffs are stripped by the cutting teeth 1 of the larger stripping angle and blade edge angle so that the cutting resistance can be further reduced, and, further, the chips being relieved by the chip relief edge 20 are caused to be relieved from the triangular surface 70 in front of the chip relief edge 20 to the front side so as to stay on the base body 22 in front of the triangular surface 70, so that the chips can be prevented from entering into the gaps between the base body 22 from which the cutting teeth 1 projects and the objective wood C and the contact resistance between constituting stuff of the objective wood C and the base body 22 can be reduced.

Figure 46:
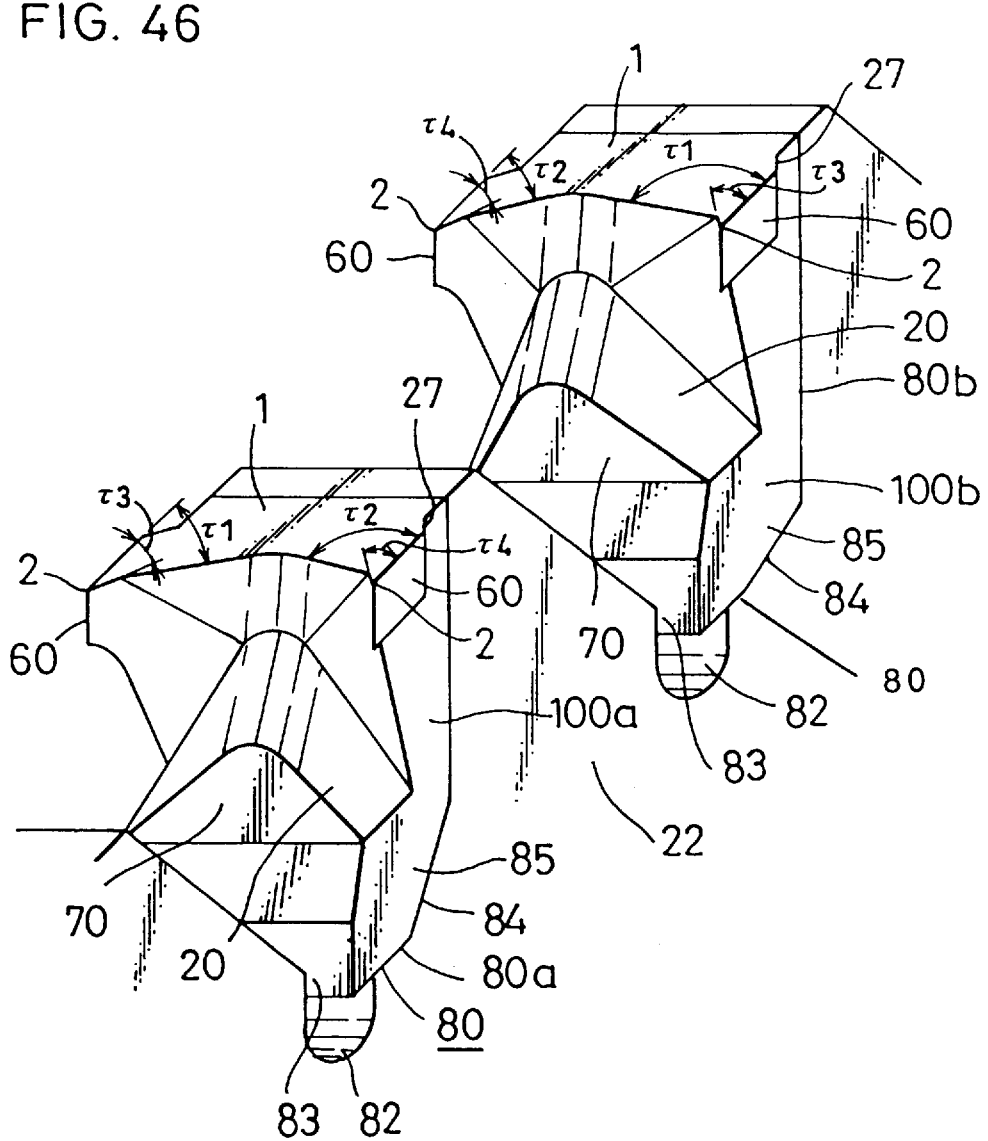
FIG. 46 is a fragmentary perspective view of a blade edge part in another embodiment of the present invention.
Figure 47A:
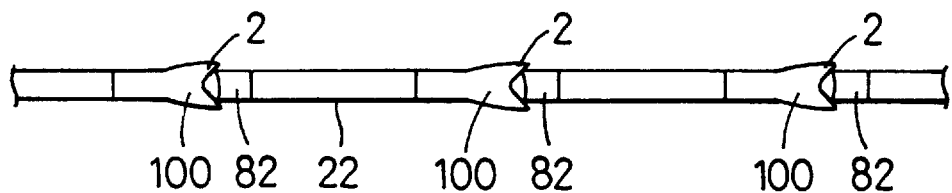
FIGS. 47a through 47c are respectively a fragmentary plan view, side elevation and front elevation of the blade edge part shown in FIG. 46.
Figure 47B:
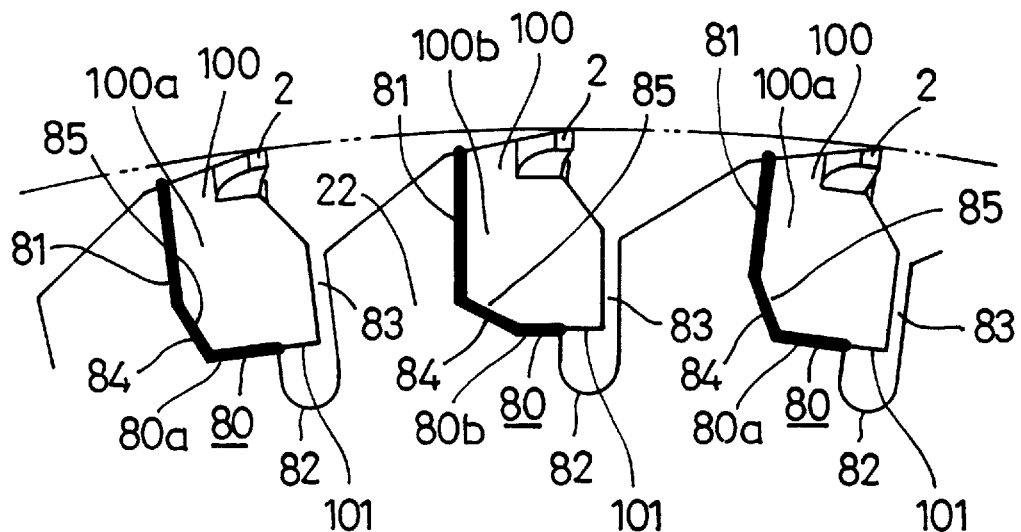
Figure 47C:
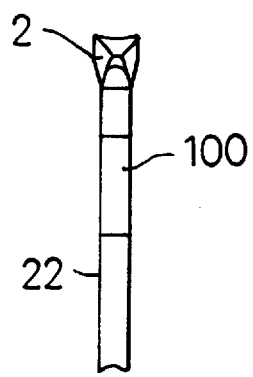

In FIGS. 46 through 48, still another embodiment is shown, in which basic formation is the same as that of the embodiment shown in FIG. 45 and any repeated description is omitted. The present embodiment is an example of tips 100 respectively including the cutting and biting teeth 1 and 2 are mounted to the base body 22. That is, many tip mounting notches 80 are formed at constant intervals in outer peripheral edge of the base body 22, the tips 100 are positioned as fitted respectively in each tip mounting notch 80 of the base body 22, and the tips 100 and base body 22 are joined by means of a laser bonding. In FIG. 47b, portions denoted by a reference 81 are the laser bonded portions. At front lower portions of the tip mounting notches 80, further, lower grooves 82 are provided, and gaps 83 are to be provided between front faces of the tips 100 and front side walls of the tip mounting notches 80 when the tips 100 are respectively fitted in rear portion of the respective tip mounting notches 80, so that the lower grooves 82 and gaps 83 prevent any thermal distortion from occurring during the laser bonding, and the grooves 82 and gaps 83 are also effective to prevent the thermal distortion from occurring due to thermal expansion when the saw blade is used, even in such saw blades that, instead of such tips having the cutting and biting teeth 1 and 2 as in this embodiment, the cutting and biting teeth 1 and 2 are integrally formed with the base body 22 by means of a grinding, or the saw blade is formed with both of MIM and grinding are employed. That is, without the lower groove 82 and gap 83, there arises the thermal distortion in the tip 100 and base body 22 upon the laser bonding, but this thermal distortion is prevented with the provision of the lower groove 82 and gap 83. Further, while a gate trace 101 given in the case when the tip 100 is mold-formed is to be remained on the tip 100, the gate trace 101 is set to be positioned on lower front part of the tip 100 so that, when the tip 100 is assembled as fitted in the tip mounting notch 80, the gate trace 101 remained on the lower front part of the tip 100 will face the lower groove 82, whereby the gate trace 101 is made to be relieved in the lower groove 82 and the tip 100 can be accurately assembled in the tip mounting notch 80 without being hindered by the gate trace 101.

Now, for the tip mounting notches 80 formed many in the outer peripheral part of the base body 22 at regular intervals, there are two types of the tip mounting notches 80a and 80b different in the shape of the fitting part for the tip 100 as shown in FIG. 48a, and these two types of the tip mounting notches 80a and 80b different in the shape of the fitting part for the tip 100 are alternately disposed one by one. In the embodiment, an angle of a sloped portion 84 at a corner in the tip mounting notch 80 is differentiated. Further, for the tip 100, there are prepared two types of tips 100a and 100b different in the shape of the tip 100. For the tips 100 different in the shape, they are such ones as shown in FIG. 46 and different in, for example, the lateral stripping angle, the two types of the tips 100a and 100b different in the lateral stripping angle are differentiated in the angle of the sloped part 85 at the corner of lower rear portion of the tips, the tip 100a is assembled as neatly fitted to the tip mounting notch 80a while the tip 100b is assembled as neatly fitted to the tip mounting notch 80b, and in this manner the tips alternately different in the shape are assembled without fail to allow the laser bonding to be performed.

In the foregoing embodiment of FIGS. 46–48, the tips may be manufactured with such material as a high speed steel powder and a super hard alloy powder preferably through MIM method, while, for the base body, ones prepared by cutting a carbon tool steel and alloy tool steel and subjected to such working as grinding and the like may be employed.

Figure 49A:
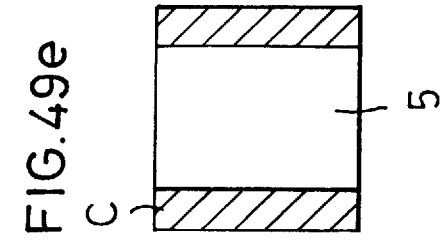
FIGS. 49a through 49e are explanatory sectioned view for cutting sequence attained by means of the blade edge part of FIGS. 46–48.
Figure 49B:
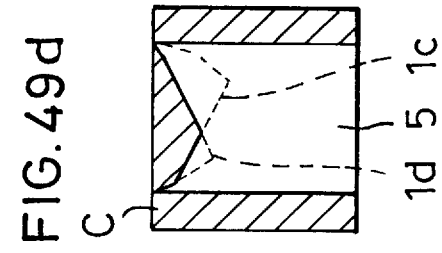
Figure 49C:
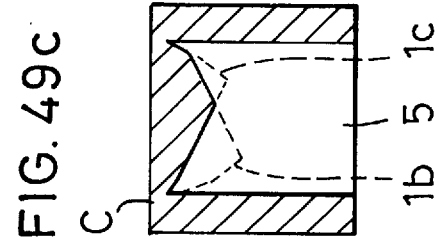
Figure 49D:
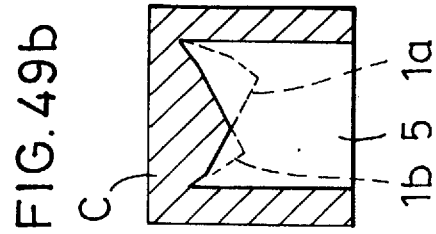
Figure 49E:
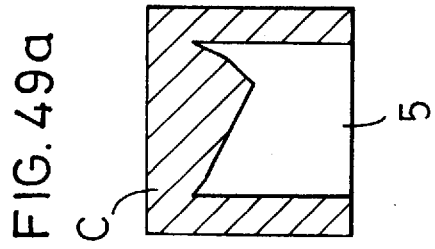
Figure 50:
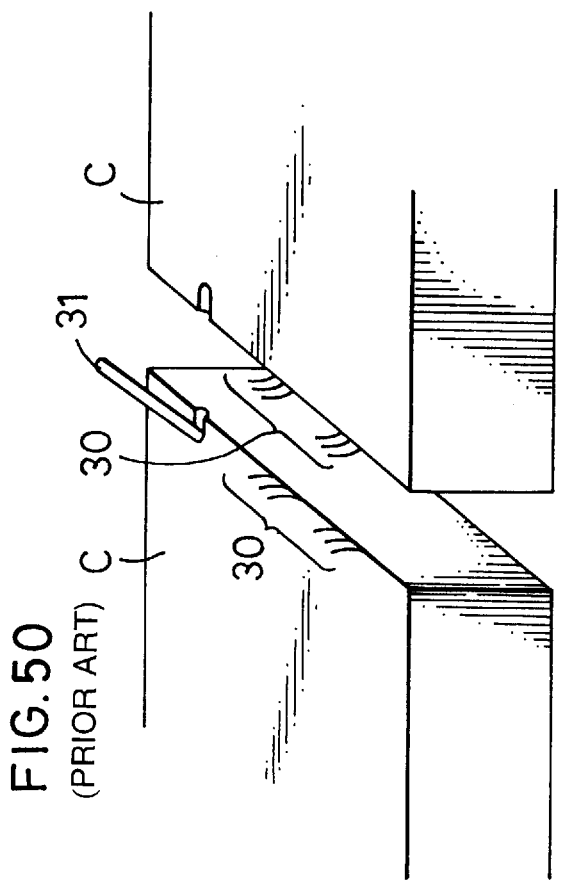
FIG. 50 is an explanatory perspective view for the "fluff" and "return".

In FIGS. 49a through 49e, a cutting sequence in the embodiment shown in FIGS. 43 through 48. In FIG. 49, 1a denotes the first cutting tooth for cutting off the objective wood C to form such cut 5 as in FIG. 49a, and 1b denotes second cutting tooth which forms such cut 5 as in FIG. 49b. Here, the cutting advances as in FIGS. 49a and 49b as the saw blade shifts through the respective positions a and b as in FIG. 43b, and the positions a and b of FIG. 43b correspond respectively to FIG. 49a and 49b. Further, 1c denotes third cutting tooth for forming such cut 5 as in FIG. 49c, and 1d denotes fourth cutting tooth for forming such cut 5 as in FIG. 49d. FIG. 49e shows a state where the cutting is completed, showing that the cutting is made occurrence of any "fluff" or "return".

Now, while in the respective foregoing embodiment of the present invention examples employing the wood C as the cutting objective have been described, saying that the saw blade according to the embodiments of the present invention are effective to the cutting of the wood C, the wood C and the like in the respective embodiment of the present invention are not limited to the wood only, but the saw blade of the respective embodiments is also effective to the cutting even when they are applied to such glass fiber containing resin as FRP and the like.

What is claimed is:

1. A saw blade comprising:

a base body having a cutting side with a plurality of tip mounting notches formed therein at constantly spaced intervals;

a plurality of tips connected to the base body such that one of said plurality of tips is mounted in a corresponding one of the tip mounting notches;

a plurality of cutting teeth formed in the tips such each tip includes one of said plurality of cutting teeth;

said cutting teeth being arranged to have a cutting direction for forming a cutting path in a workpiece, each of said cutting teeth including:

a pair of side edges;

a pair of biting teeth disposed adjacent the side edges;

a blade edge extending between outer side corners of the pair of biting teeth and arranged to face in the cutting direction, the blade edge having a central portion that is retracted opposite from the cutting direction;

a chip relief edge provided on a front side surface of each cutting tooth facing toward the cutting direction and extending up to a position intermediate the height of the cutting tooth and projecting in the cutting direction, the chip releasing edge being formed in a triangular pyramid shape, the chip releasing edge having a top end which is positioned below a bottom point of retraction of the blade edge in the cutting direction.

2. The saw blade according to claim 1 wherein each of the tip mounting notches includes a lower groove formed at a front lower portion thereof to provide a gap between a front face of each tip and a front side wall of the tip mounting notch with each tip being mounted in a rear portion of the corresponding tip mounting notch, wherein the tips are provided in two types that have different lateral chip strip-off angles between the pair of biting teeth, with the retracted portion of the blade edges of adjacent tips having a bottom region deviated laterally from the center of the blade toward opposite sides thereof, wherein the two types of tips differ in sloped angle where lower rear corners of the tips are mounted to rear a portion of the tip mounting notches, and wherein the tip mounting notches are also provided in two types mutually different in sloped angle at the rear portion, said two types of tip mounting notches being provided alternately in the base body to have the two types of tips alternately mounted to the two types of notches.

* * * * *